United States Patent [19]

Barnsley et al.

[11] Patent Number: 4,941,193
[45] Date of Patent: Jul. 10, 1990

[54] METHODS AND APPARATUS FOR IMAGE COMPRESSION BY ITERATED FUNCTION SYSTEM

[75] Inventors: Michael F. Barnsley; Alan D. Sloan, both of Atlanta, Ga.

[73] Assignee: Iterated Systems, Inc., Norcross, Ga.

[21] Appl. No.: 104,412

[22] Filed: Oct. 2, 1987

[51] Int. Cl.$^5$ ............................................. G06K 9/36
[52] U.S. Cl. .................................... 382/56; 382/41; 340/499; 364/518
[58] Field of Search ......................... 382/1, 41, 44, 56; 340/750, 798, 799; 364/514, 518, 522, 523

[56] References Cited

U.S. PATENT DOCUMENTS 4,694,407 9/1987 Ogden .................................. 364/521

OTHER PUBLICATIONS

Barnsley et al., *Iterated Function Systems and the Global Construction of Fractals*, Proc. R. Soc. Lond., A 399, 243-275 (1985).
Barnsley et al., *Solution of an Inverse Problem for Fractals and Other Sets*, Proc. Natl. Acad. Sci, USA, vol. 83, 1975-1977, Apr. 1986.
Barnsley et al., *A New Class of Markov Processes for Image Encoding*, School of Mathematics, Georgia Inst. of Technology Preprint (1980).
Barnsley et al., Fractal Modelling of Biological Structures, Perspectives in Biological Dynamics and Theoretical Medicine, Koslow, Mandell, Shlesinger, eds., Annals of New York Academy of Sciences, vol. 504, 179-194 (1987).
Barnsley, et al., Hidden Variable Fractal Interpolation Functions, School of Mathematics, Georgia Inst. of Technology (Jul. 1986).
Elton, An Ergodic Theorem for Iterated Maps, *Ergodic Theory and Dynamical Systems*, 7 (1987).
Demko et al., Construction of Fractal Objects with Iterated Function Systems, SIGGRAPH '85 Proceedings, vol. 1, No. 3, 271-278 (1985).
Barnsley et al., Fractal Modelling of Real World Images, Lecture Notes for Fractals: Introduction, Basics and Perspectives, SIGGRAPH (1987).
Peterson, Packing It In–Fractals Play an Important Role in Image Compression, Science News, vol. 131, No. 18, pp. 283-285, May 2, 1987.
Dunn, Fractal Geometry—Understanding Chaos, Georgia Tech Alumni Magazine, p. 16 (Spring 1986).
McDonald, Fractals—A Geometry of Nature, Georgia Institute of Technology Research Horizons, p. 9 (Spring 1986).
Michael F. Barnsley and Alan D. Sloan, *A Better Way to Compress Images*, BYTE Magazine (Jan. 1988), pp. 215-223.
Michael F. Barnsley, Arnaud Jacquin, Francois Malassenet, Harnessing Chaos for Image Synthesis, Computer Graphics 22 (Aug. 1988), pp. 131-140.
Michael F. Barnsley and John H. Elton, *A New Class of Markov Processes for Image Encoding*, Adv. Appl. Prob. 20, 14-32 (1988).

Primary Examiner—Leo H. Boudreau
Assistant Examiner—Jose L. Couso
Attorney, Agent, or Firm—Jones, Askew & Lunsford

[57] ABSTRACT

A method and apparatus for obtaining highly compressed images employing an iterated function system (IFS). An original input or target image is subdivided into regions having similar characteristics. Contractive copies or maps of a particular region, which are the results of affine transformations to the region, are generated and tiled with respect to the input image until the entire region is covered and a collage is formed. Each region is processed in like manner. The affine transformation coefficients or IFS codes completely represent the input image, and are stored or transmitted. To generate an image from the IFS codes, a decoding system is disclosed. One disclosed method involves a chaotic dynamical system. A random iteration of the IFS codes is performed until an attractor, which is the target image, emerges and stabilizes. Another disclosed deterministic method repeatedly and successively applies the IFS codes to an arbitrary starting image until the attractor emerges. Also disclosed are various methods for representing and compressing the color information of an image, including a method for employing an additional spatial dimension in the mappings and a method for employing an arbitrary probabilistic measure for the color rendering.

69 Claims, 16 Drawing Sheets

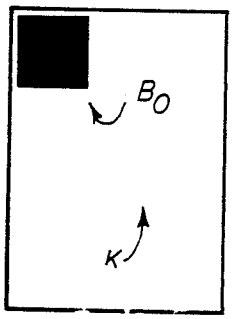
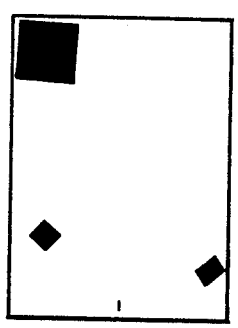
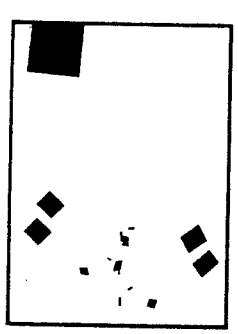
FIG 6A    FIG. 6B    FIG. 6C
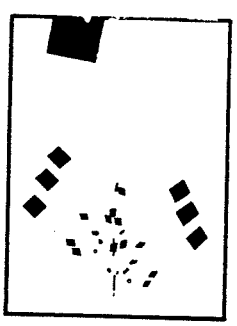
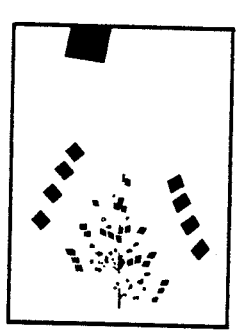
FIG. 6D    FIG. 6E    FIG. 6F
FIG. 6G    FIG. 6H    FIG. 6I
FIG. 6J

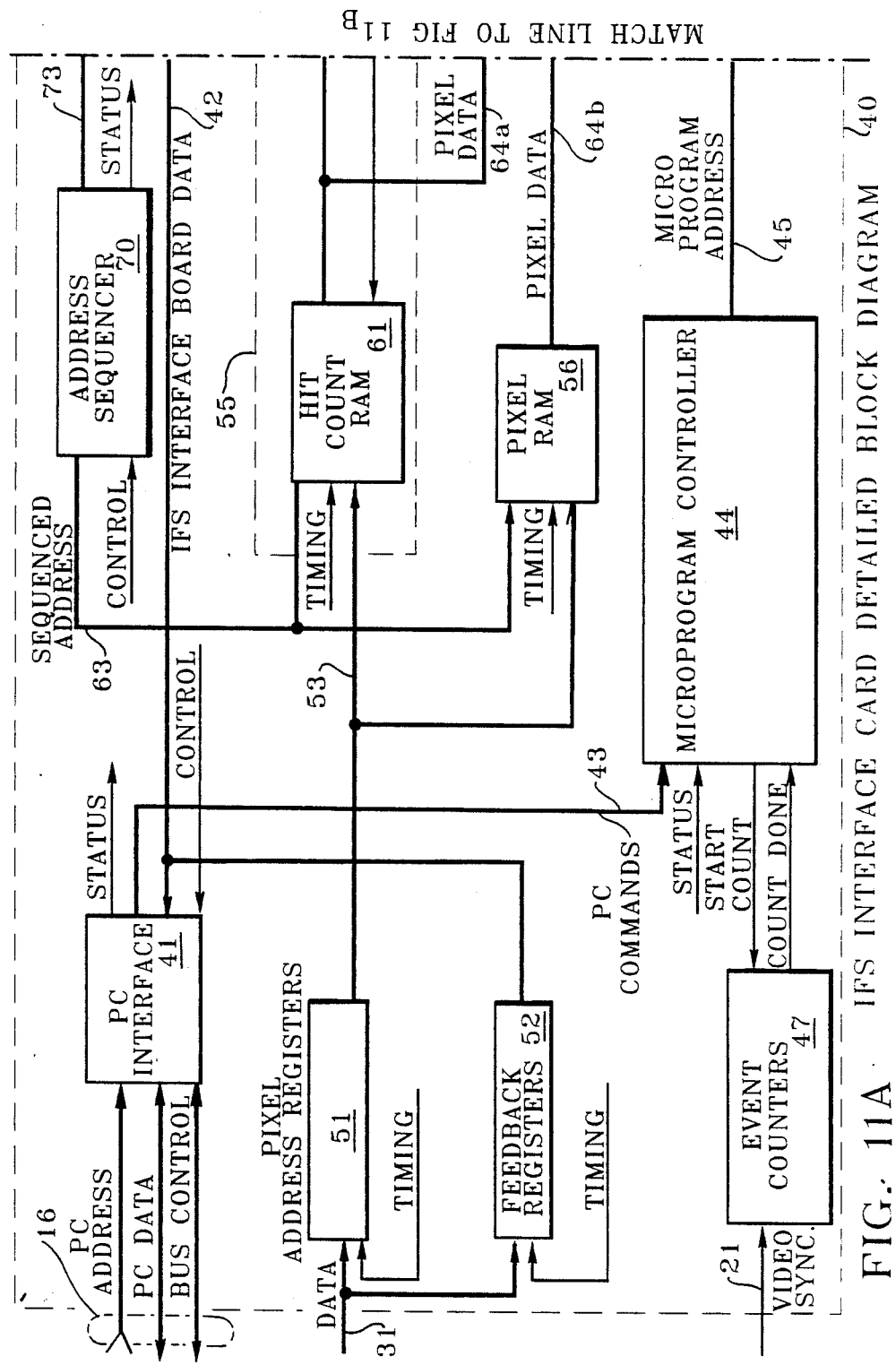
FIG. 11A  IFS INTERFACE CARD DETAILED BLOCK DIAGRAM

Random Iteration Decoding Method

Input for each processor

1. Coefficients defining N affine transformations $W_i (i=1,...,N)$
2. Probabilities $P_i (i=1,...,N)$ associated with the frequency of selecting each Wi
   [Default: each $P_i = 1/N$]
3. Initial point $X_0 \in K$
   [Default: $X_0 = (a,...,a)$, where a= (processor #)/(number of processors)]

Initialization of each processor

1. Store coefficients defining each $W_i$ in coefficient RAM for later retrieval by index i.
2. Load probability RAM with indices i (i=1, ...,N), each index to appear $P_i \times L$ times, where L is the number of locations for storing indices.
3. Clear hit count RAM and pixel RAM.
   Set iteration index j=o. Stop and reset completion timer.
4. Compute contractivity factor S and number of iterations H required to ensure transformed point lies within the attractor A.

Generate Point for Display

1. Generate random number r, 0<r<M.
2. Retrieve transformation coefficient i from rth position in probability RAM
3. Retrieve coefficients for $W_i$ from coefficient RAM
4. Generate $X_{j+1} = W_i X_j$
5. If j < H, increment j and go to 1
6. Turn on pixel RAM for pixel location corresponding to $X_{j+1}$
7. Increment hit count RAM at location corresponding to $X_{j+1}$
8. If hit count RAM location = 1, reset and start completion timer.
9. Increment j. Go to 1.

FIG. 15

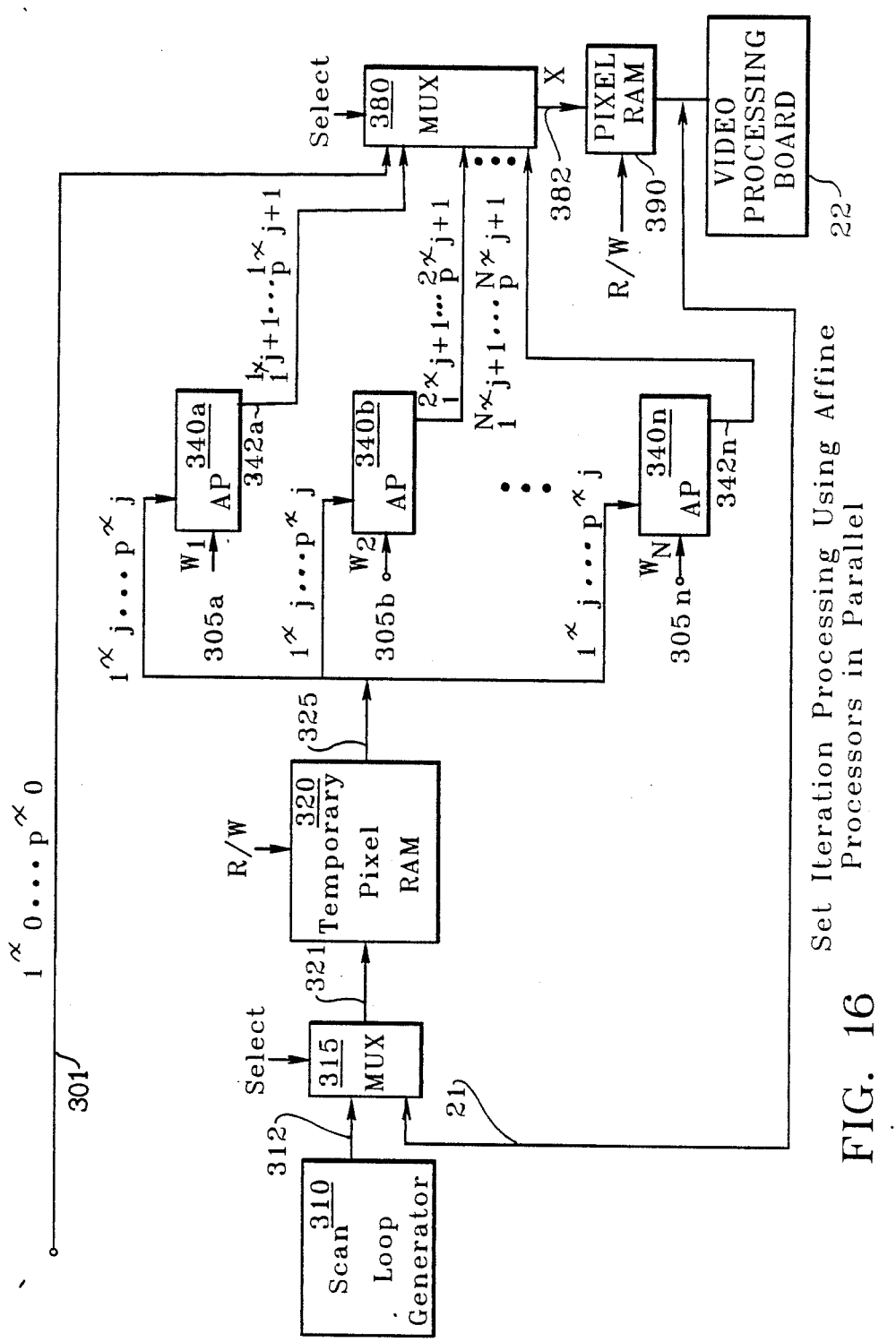
FIG. 16 Set Iteration Processing Using Affine Processors in Parallel

Set Iteration Decoding Method

Input for Ith processor

1. Coefficients defining Ith affine transformation $W_L \in$ $\{W_1, W_2, ..., W_N\}$
2. Initial Set $\{_1X_0, _2X_0, _3X_0, ..._pX_0\} \in K$
   [Default: a square with side of convenient length centered in K]

Initialization of each processor

1. Store coefficients defining $W_I$ in the coefficient RAM for later retrieval by index I
2. Clear hit count RAM. Set iteration index j=0.
3. Clear pixel RAM and load with initial set of points
4. Compute contractivity factor S and number of iterations H required to ensure transformed point lies within the attractor A.

Generate Image for Ith Processor

0. Transfer pixel RAM to temporary pixel RAM; Clear pixel RAM
1. Set up loop to scan temporary pixel RAM for points in set
2. Get next point in set
3. Transform point with $W_I$, store transformed point in pixel RAM
4. If scan of temporary pixel RAM is incomplete, go to 2
5. If j > H, increment hit count RAM at locations corresponding to $X_{j+1}$
6. If iteration index j < H, increment j and go to 0
7. If pixel RAM = temporary pixel RAM, stop
8. Increment j and go to 0

Generate Image

1. Take union of images generated by Ith processor for i = 1,2,...N by averaging hit counts
2. Replace initial image with union
3. Repeat steps 1 and 2 until image stabilizes

FIG. 17

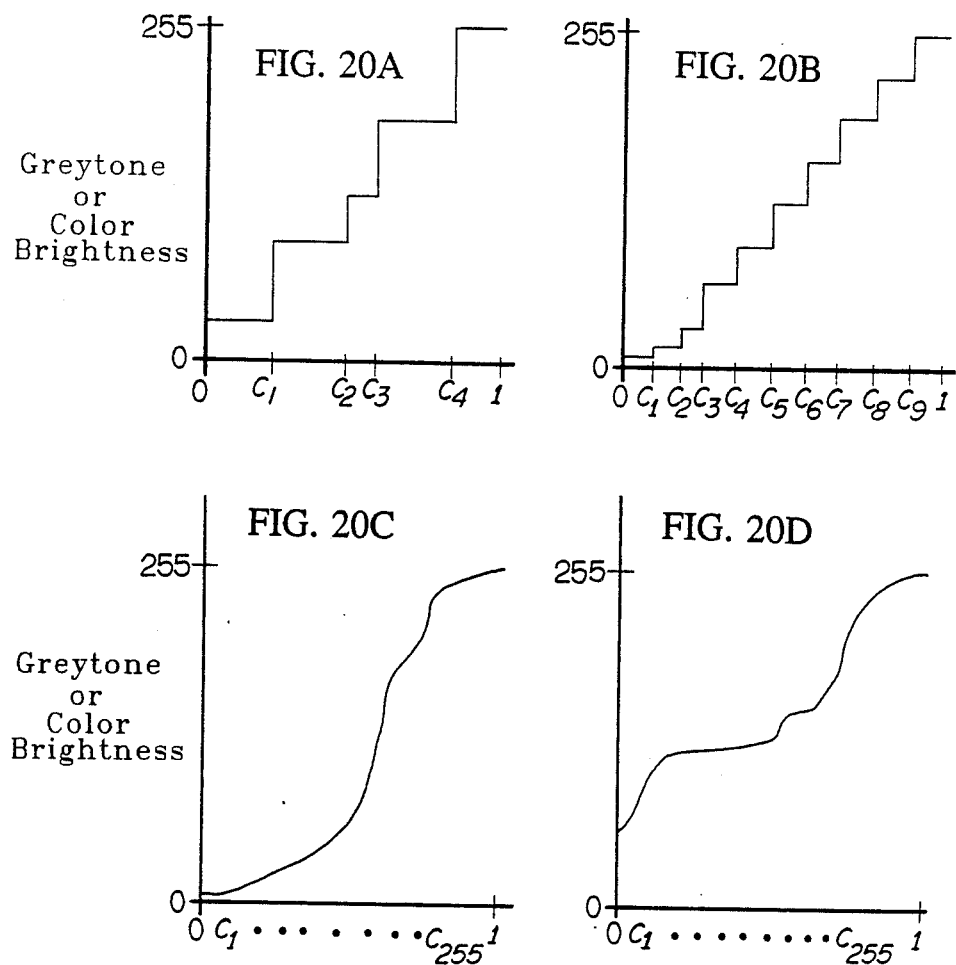
Acceptable Color Mapping Functions
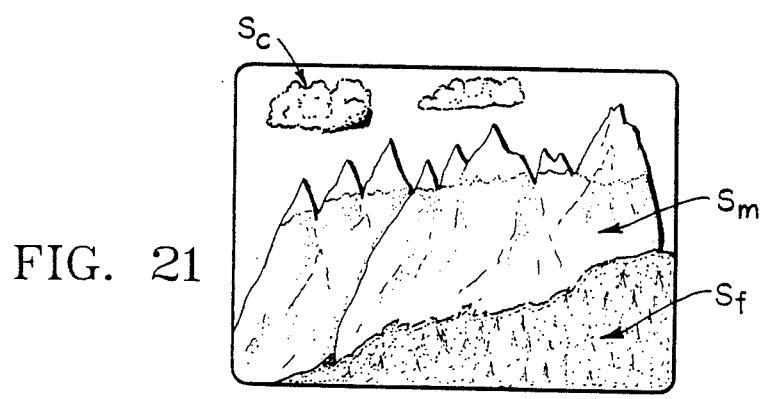
FIG. 21

METHODS AND APPARATUS FOR IMAGE COMPRESSION BY ITERATED FUNCTION SYSTEM

TECHNICAL FIELD

The present invention relates generally to image compression, and relates more particularly to methods and apparatus which employ an iterated function system to provide highly compressed images. The present invention also relates in particular to finding specific representations of real-world images by applying multi-dimensional contractive affine transformation maps to the input images, thereby obtaining highly efficient image compression.

BACKGROUND OF THE INVENTION

An outstanding problem in computer science relates to image and data compression. To understand the problem, consider a digitized graytone image, such as a photograph of a natural scene, of size 1024×1024. If there are 256 graytone intensities, then the image is completely described by a binary string of 1024×1024×8 bits. Hence, if no compression is used, more than one megabyte of core memory is required by an computer simply to be able to handle one image. Image compression involves decreasing the length of the binary string in such a way that the exact image can be retrieved. Prior art image compression techniques yield poor results; for typical images of the type just described, compression ratios range between 0.5 and 0.1.

There are four main reasons for desiring effective compression. First, the speed of transmission of a data file is essentially proportional to its size. The larger the file, the longer it takes to transmit. Secondly, the storage space required is proportional to the file size. To keep sixty uncompressed images of the type mentioned above requires sixty megabytes of storage space. If compressed to fifty percent, twice as many images can be kept in the same space. The third reason is that compressed images cost less to transmit, process and store. The fourth reason concerns the rate at which the information can be processed. For example, suppose it is required to compare an image against a library of stored images to detect whether or not a rocket launch event has taken place. The only difference between the images may be in a minute smoke trail—to detect this from uncompressed data, it is necessary to compare the files bit by bit. Alternatively, one may compare the compressed files, at correspondingly greater rates. The point is that all the information is present in the compressed code. For this reason, if no other, data compression is likely to play an important role in knowledge based computing systems.

Many data files contain much redundant information. For example, an image of a natural scene may contain a meadow, trees and sky. Once one knows what a particular blade of grass looks like, one has useful information about the others, so there are enormous amounts of redundant information in a meadow scene. The pine needles on a pine tree are by no means randomly placed in the image; they are organized by the underlying structure of the tree. The structures of the clouds are governed to good approximation by briefly expressed equations of physics, such as the Navier-Stokes equations. These statements are not meant to imply how compression is to be achieved, but to argue that it is possible.

The need for compression increases in significance when data files describing three, four, and five dimensional scenes are considered. Vast data bases currently need to be accessed and processed in real time in flight simulators and in autonomous flying craft. Topographical data together with reflectance, radar and microwave characteristics, for significant areas of the North American continent must be utilized in simulators. Similar data sets need to be resident in machine intelligent low-flying craft. In these circumstances, not only do the required data files increase in size by orders of magnitude, but also the proportion of redundancy in the information increases, meaning that improved compression ratios should be achievable.

In the present state of the art in computer graphics, there are many problems in representing real-world images in forms for computer based storage, transmission or communications, and analysis. For example, although the details in a mountain landscape are easily captured in a photograph, a computer re-creation would normally require a complicated program or the storage of millions of bits of data. Efficient compression schemes could result in more effective means for storing data in a computer's memory, for transmitting photographs over telephone lines, for recognizing specific objects in a landscape, and for simulating natural scenery on a computer.

Paradoxically, the continuing improvements in computer graphic hardware and software only compound the problems encountered. Faster hardware for computer graphics increases the rate of graphic production and thus increases demand on transmission or storage. The quest for realism drives graphics software to produce images of increasing complexity. Increasing image complexity means more information must be transmitted or stored for each image. Sophisticated printers also increase transmission and storage requirements. Recently available color printers are a case in point. Producing an $8\frac{1}{2}''$ by 11'' color printout at 300 dots per inch resolution and 24 bits per dot can consume over 20 megabits of data. Even at the ISDN (Integrated Services Digital Network) bandwidth of 64,000 bits per second, it will take over five minutes to supply the necessary data to drive the printer.

Accordingly, there is a clear need for an efficient and effective method and apparatus for compressing high resolution image data for storage or communications.

As is known to those skilled in the art, digital data compression consists of encoding and decoding phases. In the encoding phase, an input string of I bits is transformed into a coded string of C bits. The ratio I:C is the compression ratio. In the decoding phase the compressed string regenerates the original data. If the compression ratio is 2:1 then in the time it takes to transmit one uncompressed image, two compressed images may be transmitted.

In the prior art, there are several major classes of image compression techniques including transform and predictive types. The International Standards Organization (ISO) and the International Telegraph and Telephone Consultative Committee (ITTCC) are considering the establishment of international standards for image compression. Basically, the compression ratios under consideration are relatively low for exact image reproduction. For example, one exact compression technique recently discussed calls for a compression ratio of 2:1. Exact compression requires that the decoded image is identical to the original image which was encoded. There are several common exact techniques. They are not particularly useful for highly compressing realistic images. In one experiment, a photo montage was run-length encoded and actually produced a 60% increase in data length over the original input file size instead of a compression. The UNIX computer operating system provides a Huffman encoder which yields a compression ratio of 10:9. A Ziv-Lempel Compress algorithm has yielded a 5:4 compression ratio for image data. Such ratios are common for exact techniques. Plainly, it has proven difficult for those skilled in the art to compress images exactly with satisfactory results.

Other prior art image compression nonexact techniques include a General Electric image compression system, originally developed at the Sarnoff Research Center, which has produced 30:1 compression ratios on still video and 100:1 compression ratios on motion video. This technique is not an exact technique at those ratios and introduces artifacts in the decoded reproduction of the original image.

Most known compression techniques work best within certain classes of images. One familiar example is the normal ASCII encoding of a page of text. Transmitting the symbols rather than a bit map of the page of text can provide a compression ratio exceeding 1000:1. It is a goal of computer development to make graphics as easy to transmit as text.

It is believed by the inventors that the key to image compression is in the redundancy found in images of natural scenes. As mentioned earlier, one pine needle in an image of a forest is more or less like any other pine needle in that image. A compressed image does not require description of each pine needle in the image; rather, a single pine needle is described and then its basic information is utilized via mathematical algorithms to reproduced other pine needles in the image in a natural manner.

Furthermore, nature is full of shapes that repeat themselves on different scales within the same object. A fragment of rock looks like the mountain from which it was fractured. Clouds keep their distinctive appearance whether viewed from the ground or from an airplane window. A tree's twigs may have the same branching pattern seen at the tree's trunk.

In all these examples, zooming in for a closer view does not smooth out the irregularities. Instead, the objects tend to show the same degree of roughness or branching at different levels of magnification. In 1975, Benoit B. Mandelbrot coined the word "fractal" to describe such irregular and fragmented shapes, which can be magnified endlessly and still retain their complicated structure.

Fractal geometry is an extension of classical (Euclidean) geometry. The areas of application and the diverse different ways in which the subject is developed and applied in science and in engineering can be envisaged when one thinks of how much of present technology is based on the use of classical geometry. For example, calculus is based on the use of straight lines when functions are magnified sufficiently, linear models for diverse phenomena in diverse areas are in vastly predominant use, straight edges and compasses are used for drawing straight lines and circles, polygonal representations of objects are used for image generation in computer graphics, and so on.

Fractal geometry is therefore a new focus for theoretical and practical research. As to what the body of knowledge which we might now want to call "fractal geometry" will look like in the future is not clear: the area is currently very active, and there are many diverse branches of study involving fractal themes in one way or another. The important point is that fractal geometry is a very diverse and yound field, and there are many different directions being taken in attempting to develop practical uses for the geometry. The area is conceivably as broad as "mechanics" or "biology". Merely because the term "fractal" appears in certain applications does not mean that the particular "fractal" techniques referred to are in any technical way related to other "fractal" techniques referred to in other applications.

The mathematics of fractals has been used to create images that look a lot like clouds, mountains and other forms. Usually, the process involves providing a computer with a small set of numbers that generates a basic shape, such as a triangle. That shape is then recreated many times on smaller and smaller scales within the original figure. Random variations are introduced to make the image look a little rougher and therefore more realistic. Such artificial landscapes can be mathematically magnified to reveal more detail, just as a close-up lens probes deeply into a natural scene. These random recursive refinement techniques of image production are totally unrelated to the techniques claimed by the inventors in this patent application.

These other fractal techniques do not achieve image compression for the following reason. In order to store any image created by one of these fractal modelling techniques it is necessary to specify a particular long sequence of numbers which specify the random variations that were used in the encoding process. To tell a computer how to recreate the image exactly, one must specify all of the random numbers which were used in the generation of the image. Furthermore, they do not in general correspond to real-world images. They are typically the result of research and experimentation with mathematical procedures (or algorithms) that happen to lead to drawings that look like natural objects. This approach is therefore not an "exact image" encoding method, since it starts with a mathematical description and results in something that looks real, but does not look like any particular real thing. There is therefore still a great need in the art of computer graphics and fractal geometry to be able to represent real-world images with fractal geometric representations.

SUMMARY OF THE INVENTION

Briefly described, the present invention provides a solution to the problem of starting with an image, for example of a natural particular object or scene, finding a specific fractal to fit it, and representing the image in terms of the mathematics of iterated function systems. The image is basically represented by a matrix of coefficients of affine transformations. The coefficients are then used to recreate the image. In one preferred embodiment, a chaotic dynamical system is set up to utilize the affine coefficients and reproduce an attractor. Because the mathematics provides a compact way to store the characteristics of an object, this approach compresses the content of an exact image into just a few coefficients. The present invention disclosed herein is believed capable of encoding high resolution graphic images exactly (or inexactly, if desired) at compression ratios better than 10,000:1 for some images. The methods can be used with classical compression techniques to increase yields.

The methods and apparatus of the present invention are based on the mathematical theory of fractal geometry and chaotic dynamical systems. A simple example will illustrate the procedure. FIG. 1 illustrates an exemplary chaotic dynamical system and contains a triangle with vertices $V_1$ at (0,0), $V_2$ at (0,1) and $V_3$ at (1,0). Choose an initial point $P_0$ in the triangle at random. An iterative procedure transforms a point $P_n$ to $P_{n+1}$ at the nth step as follows: Choose a number k from among the numbers 1, 2 or 3 at random. Point $P_{n+1}$ is the midpoint on a line between $P_n$ and $V_k$. Throw away the first 25 points and plot the rest. For example, assume that the random sequence $V_3$, $V_2$, $V_3$, $V_1$... was chosen in FIG. 1 as shown.

FIG. 2, which is known as a "Sierpinski gasket," is the result of the chaotic dynamical process of FIG. 1. This same figure is generated regardless of the location of the starting point and the order of selecting vertices, i.e., it is independent of the initial point $P_0$ and independent of the sequence of random numbers which were chosen in its generation. The image in FIG. 2, the Sierpinski gasket, is encoded by the process of its creation at a compression ratio exceeding 10,000:1. The encoding comprises merely the mathematical statement that the entire Sierpinski gasket is represented by the rule, "plot point $P_{n+1}$ at the midpoint of a line between $P_n$ and $V_k$, where $V_k$ is chosen at random."

The compression technique is computation intensive in both the encoding and decoding phases. The preferred method is performed in a dedicated encoding/decoding system, as disclosed herein and called an "iterated function system image synthesizer" or IFSIS, which can decode at the rate of several video frames per second. The extreme compression ratios enable this graphic device to be coupled to a host computer whick treats the IFSIS as if it were an output device such as a printer. However, instead of text, complex color images are produced. Networking and high resolution real time animated graphics can be simultaneously realized by means of the IFSIS device. High performance IFSIS-type devices may be combined with ISDN telecommunications to allow full color animation at video rates over phone lines. A plurality of decoders can be employed in a parallel arrangement to effect more rapid image processing.

More particularly described, the methods and apparatus of the present invention start with a digitized input image or picture. Such a picture may consist of, for example, a 1,000 by 1,000 grid of dots or pixels, i.e., picture elements. Each pixel is assigned a predetermined number of bits to represent color or gray scale, say, eight bits of data to represent 256 different shades of gray or an equal number of different colors. Thus, for example the entire picture can be thought of as a string of 8 million ones and zeros, one digit for each bit. This string of digits is encoded employing the method of the present invention to produce a new, shorter string of digits to compress the image. The compressed string is able to reproduce, pixel for pixel, the original picture.

The disclosed embodiment of the present invention employs mathematical operations called affine transformations. An affine transformation behaves somewhat like a drafting machine that takes in a drawing (or the coordinates of all the points making up the lines in a drawing), then shrinks, enlarges, shifts or skews the picture and, finally, spews out a distorted version of the original. Affine transformations can be applied to any object—triangles, leaves, mountains, ferns, chimneys, clouds—or even the space in which an object sits. In the case of a leaf, for example, the idea is to find smaller, distorted copies of the leaf that, when fitted together and piled up so that they partially overlap, form a "collage", which approximately adds up to the original, full leaf. Each distorted, shrunken copy is defined by a particular affine transformation—a "contractive map", as it is called—of the whole leaf. If it takes four miniature copies of the leaf to approximate the whole leaf, then there will be four such transformations.

Now the original image or "target", whether leaf or cloud or otherwise, can be discarded, leaving only the corresponding collection of affine transformations. These are used to recreate the original image by starting with a single initial point on a computer display screen or other output medium. One of the affine transformations is applied to the point to shift it to a new spot. That spot is marked, and displayed, by storing the location spot in memory. Another one of the transformations is picked at random and applied to the previously-marked spot to shift the point to yet another location. The new spot is similarly marked and displayed, and the process is iterated repetitively.

Contrary to intuitive perception, although the displayed point initially appears to hop about randomly, first pulled one way, then another, as might be expected because of the random selection of affine transformations, a pattern gradually emerges. The image which results from the plotting of a plurality of points after a predetermined minimum number of iterations is called an "attractor". In the case of the four leaf transformations, the attractor is an object that looks very much like the original leaf.

How this part of the process works is as described above in connection with FIGS. 1 and 2. In that case, there were three possible transformations. The transformation designates a new point halfway between the original point and one of the corners, depending on the choice of transformation. Randomly applying a second transformation (it may be any one of the three vertices available in that case) locates another point halfway between the previous point and the appropriate corner. Chasing the point around the sheet of graph paper, marking each landing spot, produces the Sierpinski fractal object of FIG. 2. This object consists of a complicated array of triangles nested within triangles nested within triangles, and so on to smaller and smaller scales.

It is known that any particular collection of affine transformations, when iterated randomly, produces a particular figure. The figure is the same regardless of the order in which the transformations are applied. The present invention provides methods and apparatus for finding the right group of transformations to use for generating a particular input image. That is done using the "collage" process (for example, a leaf covered by little copies of itself), which is described in more detail hereinbelow. Furthermore, the probability of using a certain transformation need not be the same as the probability of applying any other transformation in the set. And because some grid squares are likely to be visited more often than others, keeping track of the relative number of visits to each square provides a way to specify color brightness and intensity or to define a gray scale. In this way, a very substantial amount of information about the input image is packed into a few formulas.

In one instance, 57 affine transformations (or maps, as they are also called) and four colors—a total of 2,000 bytes of information—were used to model three chimneys set in a landscape against a cloudy sky. The graphic model gives the ability to "fly into the picture." An output display can pan across the image, zoom into it, and make predictions about details which may or may not be explicitly shown in the original picture. As the picture is expanded to show more and more detail, parts of it may degenerate into nonsense, but some features, such as the chimneys, the smoke and the horizon, remain reasonably realistic, even when the image compression ratio is better than 10,000 to 1. Accordingly, the present invention has utility for flight and other movement simulators which require very rapid reproduction of high resolution images.

Still more particularly described, the preferred embodiments of the method and apparatus start with an original input image. This input image may be either a bit-mapped representation, or may also be a polygonal or other geometrical representation. The first step taken in the preferred method is to generate with the computer a contractive map of the original input object. The contractive map need not necessarily appear contractive, but it should be mathematically contractive. This is described in more detail in the Detailed Description.

Assume for purposes of discussion that the original input image is a graphic object of a leaf A, as shown in FIG. 13. The contractive map A' is generated. The contractive map is then affinely transformed with the computer, and the affinely transformed copy is then dragged with a mouse or other operator control and overlaid on top of the original input object. Preferably, the affinely transformed and contractive copy is positioned with respect to the original input object such that geometric features of the copy align with and cover similar geometric features of the original object. In the process of creating the affine copies, the coefficients of the affine transformation are stored as codes.

The steps of creating affine transformation contractive copies, moving them to align with and cover features of the original input object, and storing the affine transformation coefficients are repeated, until all of the original graphic input image is "covered" as shown in FIG. 3. It will be noted at this juncture that when the described method is carried out, either manually or automatically, there will often be gaps or overlaps in coverage of the original image by the affine transformation copies. These gaps or overlaps lead to errors or inefficiencies in the image which is reproduced, because information is not preserved in the case of a gap or is redundant in the case of an overlap. The preferred method seeks to minimize these errors in the encoding process by iteratively employing a signal or data representing the error to minimize the error.

The affine coefficients then represent the encoded image, and are stored or transmitted. These coefficients are also called iterated function system or "IFS" codes.

One method to reproduce an image from the stored affine transformation coefficients or IFS codes, the random iteration method, is to select, at random if desired, an initial point on a display map. The initial point is then affinely transformed in accordance with a randomly selected IFS code to reach or visit a second point. The second point is then similarly transformed with a randomly selected IFS code to visit a third point, the third point is transformed with a randomly selected IFS code to visit a fourth point, and so on. Eventually, after a certain number of iterations, an attractor will emerge. After discarding a predetermined number of iterations sufficient to allow the attractor emerge, the points are plotted in the display space. The attractor, which comprises the results of a number of iterations which correspond to the output display resolution, represents the reproduced image.

In effect, a random walk in the display space is generated from the IFS codes in this first method. The measures of the pixels are obtained from the relative frequencies with which various regions in the display space are visited.

A second method of the present invention for reproducing images is the deterministic or set method. In this method, the affine transformations are iteratively and successively applied to a display map. An initial image, which again may be random, is generated. Each of the affine transformations is applied to the initial image, and the union of the results of this image is preserved as a second image. Each of the affine transformations are again applied to the second image to obtain a third image, similarly each are applied to the third image to obtain a fourth image, etc. The attractor emerges and stabilizes about when the display screen resolution is reached.

Two different methods for representing color information are disclosed. In a first method, color information is represented by use of a special affine transformation map which is specifically generated for purposes of encoding color. In this method, the system generates an affine transformation of a map which is distorted to "fit" a particular color area. This particular map is assigned a probability in accordance with a predetermined color. The IFS codes associated with this color map are then stored in the usual manner together with the other IFS codes, which primarily represent the geometry of the image.

Upon reproduction of the image, points in display space which correspond to the colored regions are visited more frequently than other spaces. Preferably, another set of probabilities, usually different from those described in the previous paragraph, are assigned to the predetermined color maps associated with particular colors. Then, when the output image is generated, a "hit count" memory is provided for storing the number of "visits" of a particular point. The quotient of the number of hits of a point by the total number of iterations is a measure of the probability of the particular point (or set of points). This probability is a number which is used to index into a color table, and select a particular color associated with the particular probability. This particular color is then assigned, and displayed, in all regions having hit counts within a predetermined range of the particular color. In this manner, probability of visiting a particular point is used as an encoding method—regions which are visited a number of times which indicate a particular probability of visitation are assigned colors in accordance with the region. The affine maps for color encoding are selected and placed with respect to the original input map so that the colored regions are visited more often.

In a second method of color representation, color is represented as another dimensional variable in multidimensional space, for example, if the image is a two dimensional or flat plane image, color then represents a third dimension. The affine transformation performed on the contractive maps or copies then necessarily affects three dimensions. The fitting or tiling of the maps with respect to the original input image is carried out in the above-described manner.

The methods and apparatus of the present invention are able to provide compression ratios which are orders of magnitude better than presently known methods. The method of the present invention also possesses a remarkable stability property—small magnitude errors in compression codes lead to small errors in the corresponding decoded images. This feature is not shared to a significant extend by any other exact image compression algorithm.

OBJECTS OF THE INVENTION

Accordingly, it is an object of the present invention to develop image compression methods and apparatus whose input is a data string, corresponding to a two-dimensional array of numerical attributes of a digitized picture, and whose output is a shorter string from which the original can be regenerated exactly or approximately.

It is another object of the present invention to provide improved image compression methods and apparatus which can be employed for exact or nonexact image representation.

It is another object of the present invention to provide improved image compression methods and apparatus which are capable of improving compression ratios by up to several orders of magnitude.

It is another object of the present invention to provide methods and apparatus for determining a fractal model which fits a given two dimensional image, and for employing the fractal model for image compression, communication, or storage, and subsequent reproduction.

It is another object of the present invention to provide methods and apparatus for rapidly calculating affine transformations and error compensation adjustments to previously-calculated affine transformations so as to effectuate more rapid iterated function system image compression.

It is another object of the present invention to provide an image compression system which represents color information as an additional dimension of the image, and allows fractal modeling and compression of the color information.

It is another object of the present invention to provide methods and apparatus for image compression employing fractal geometry.

It is another object of the present invention to provide methods and apparatus for image compression which does not require infinite precision arithmetic for implementation, and which can provide satisfactory image compression employing an approximated contractivity condition.

It is another object of the present invention to provide an interactive geometric modeling system for finding iterated function system codes.

It is another object of the present invention to provide a random iteration system for computing the geometry of, and rendering, images starting from iterated function system codes.

It is another object of the present invention to provide image compression methods and apparatus wherein small changes or errors in the codes representing the compressed image produce but small changes or errors in the resultant decompressed image.

It is another object of the present invention to provide improved image compression methods and apparatus which can be implemented in a highly parallel manner, thereby gaining additional speed in processing and image generation.

It is another object of the present invention to provide methods and apparatus for image compression employing chaotic dynamical systems which are amenable to implementation with parallel processors.

It is another object of the present invention to provide a parallel image processor for carrying out a random iteration method of image decompression based on iterated function systems.

It is another object of the present invention to provide a parallel image processor for carrying out a deterministic iteration method of image decompression based on iterated function systems.

It is another object of the present invention to provide methods and apparatus for representing color information of a graphic image in a manner which is capable of being reproduced in an iterated function system.

It is another object of the present invention to provide methods and apparatus for representing color information of a graphic image with IFS codes.

It is another object of the present invention to provide a method and apparatus for representing color information of a graphic image as an additional spatial dimension so that a color graphic image may be represented, stored, communicated, and manipulated with an iterated function system.

These and other objects, features, and advantages of the present invention may be more clearly understood and appreciated from a review of the following detailed description of the disclosed embodiments and by reference to the appended drawings and claims.

BRIEF DESCRIPTION OF THE DRAWING FIGURES

FIG. 6, consisting of FIGS. 6A through 6J, illustrates the results of the set or deterministic decoding method of the present invention carried out for an exemplary encoded graphic object.

Figure 7A:
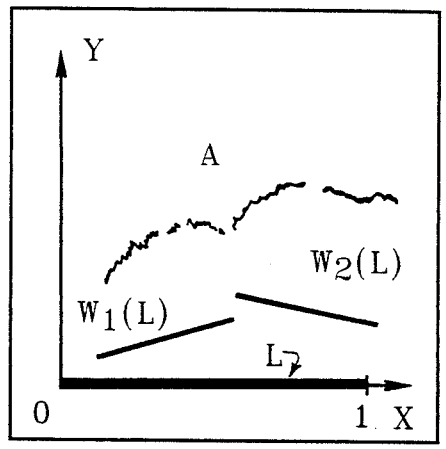
Figure 7B:
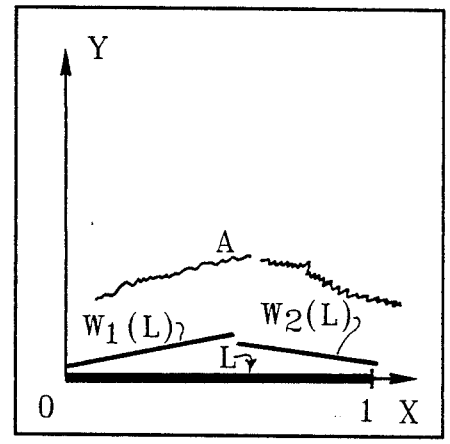
Figure 7C:
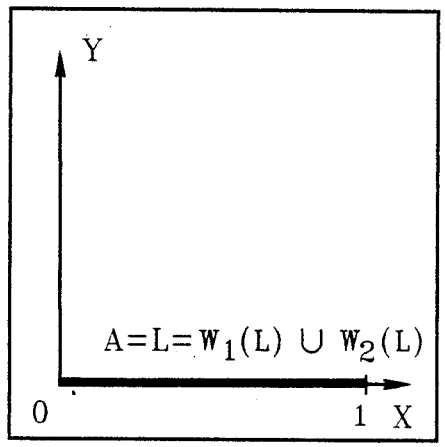

FIG. 7, consisting of FIGS. 7A through 7C, illustrates the relationship between the Hausdorff distance between an attractor A and an original image L, and the Hausdorff distance between the original image and the union of affine transforms of it.

Figure 8A:
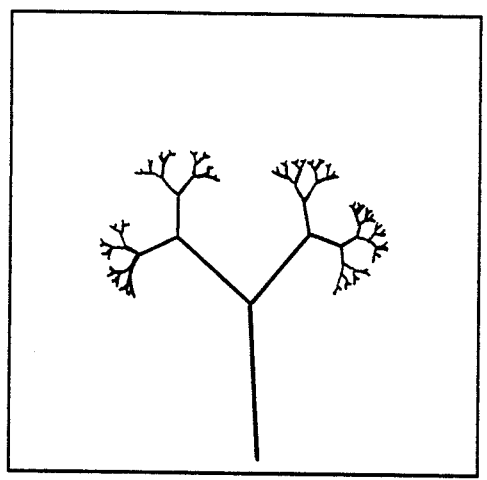
Figure 8B:
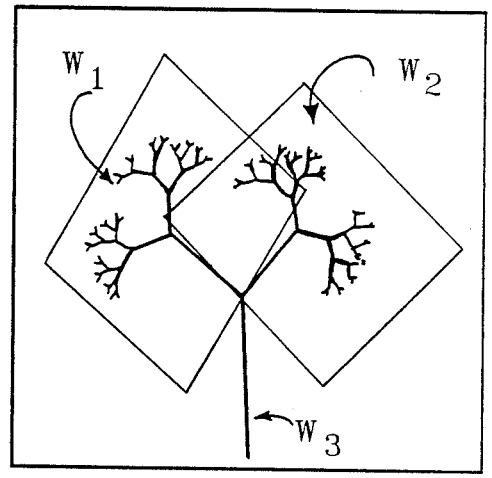

FIG. 8, consisting of FIGS. 8A and 8B, illustrates the application of the Collage Theorem to an exemplary graphic object, a tree-like structure.

Figure 9:
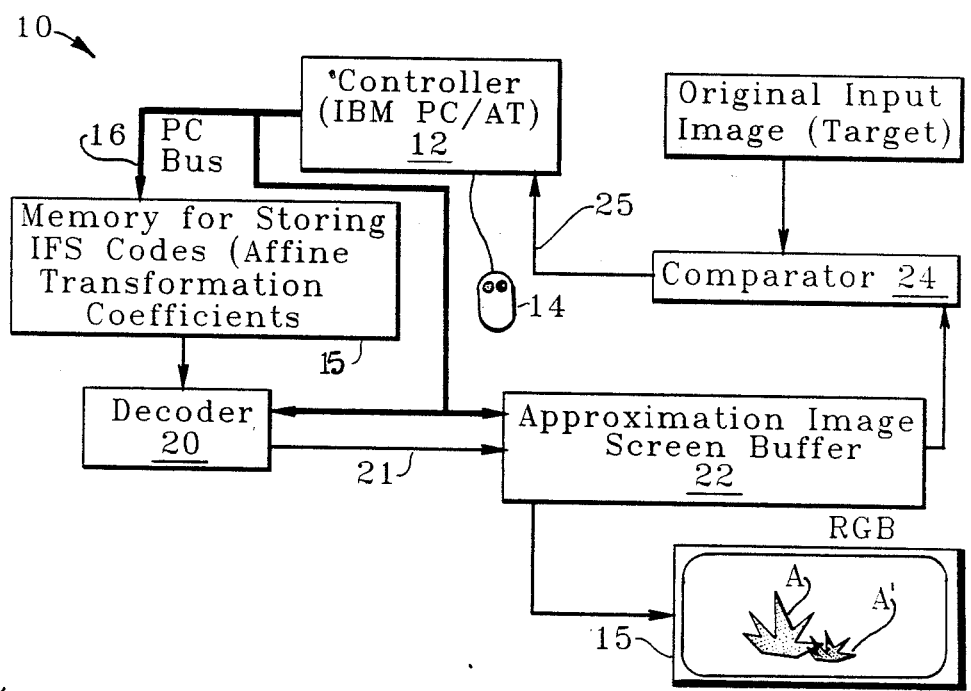

FIG. 9 is a block diagram of a system for image compression and decompression constructed in accordance with the preferred embodiment of the present invention.

Figure 10:
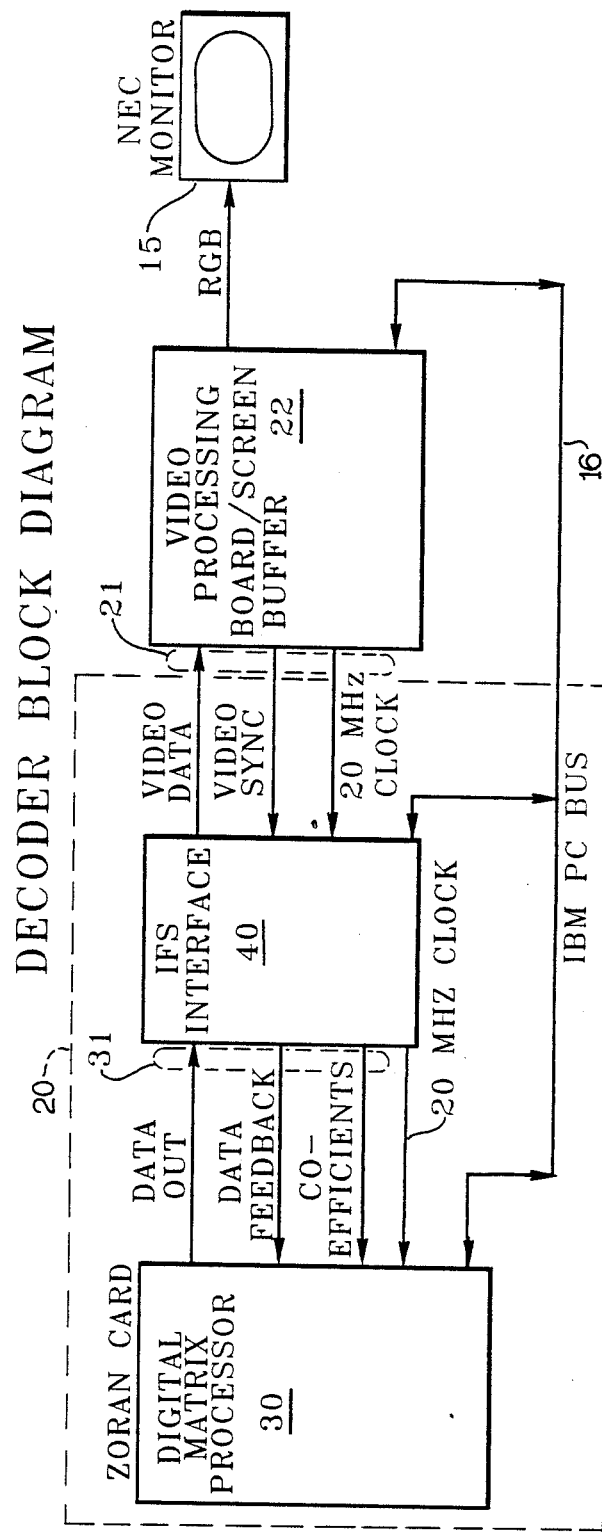

FIG. 10 is a block diagram of the preferred embodiment of the decoder circuit employed in the preferred embodiment of FIG. 9.

Figure 11B:
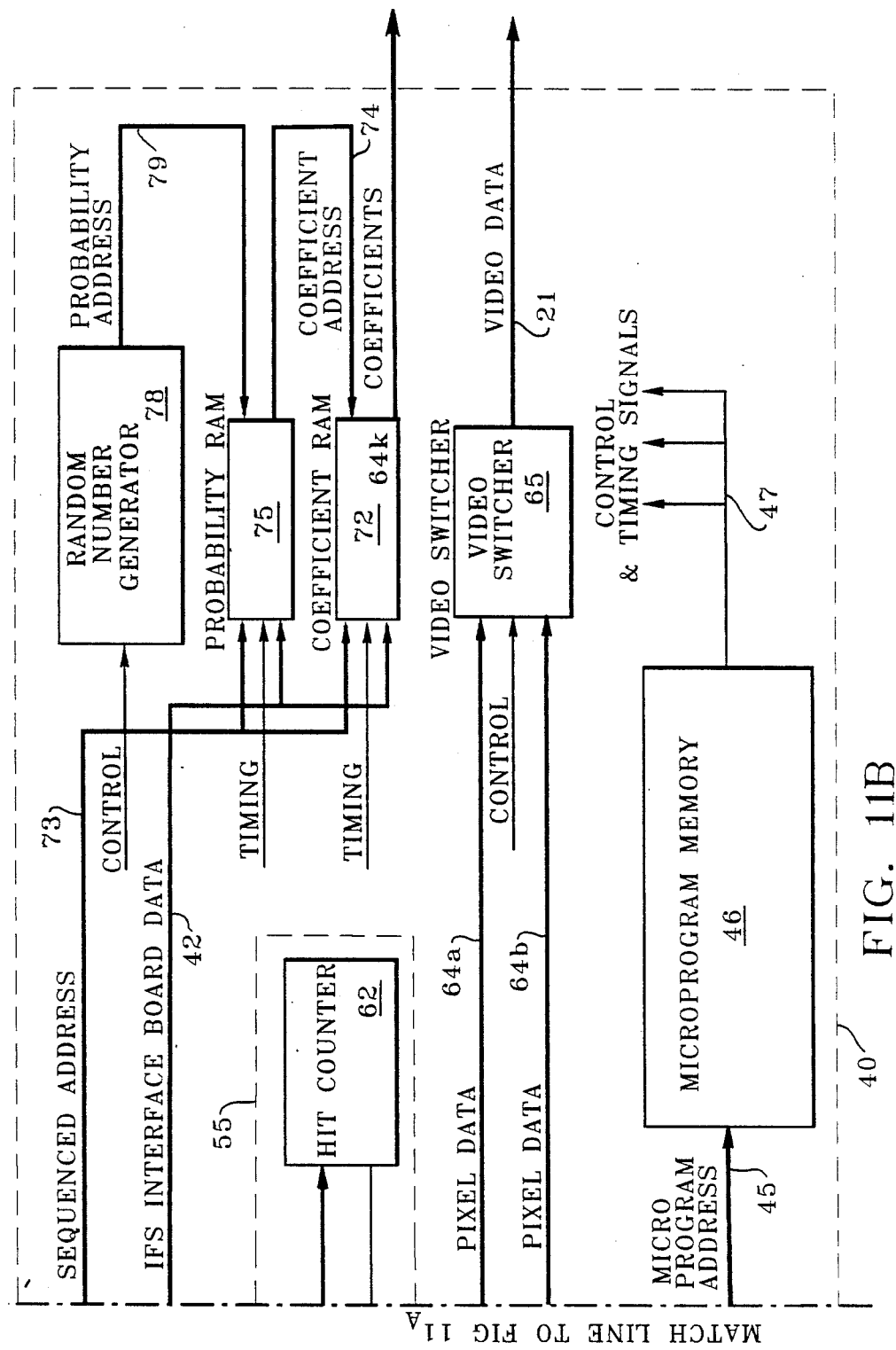

FIG. 11 is a detailed schematic block diagram of the the IFS interface circuit employed in the decoder circuit illustrated in FIG. 10.

Figure 12:
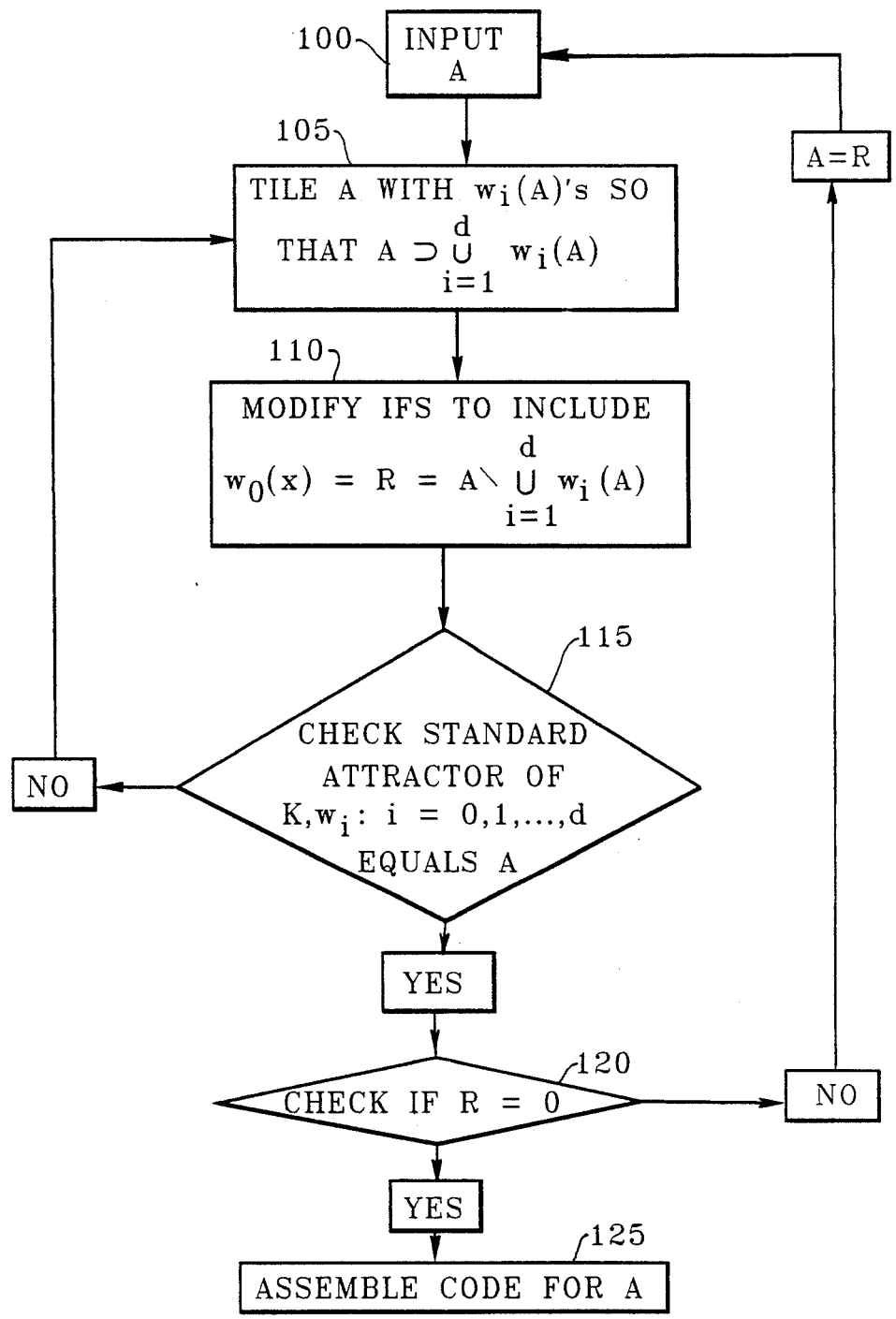

FIG. 12 is a flow chart diagram which illustrates the method for generating and tiling contractive maps with respect to an original input image.

FIG. 13 illustrates the generation and tiling of contractive maps according to the method described in connection with FIG. 12.

Figure 14:
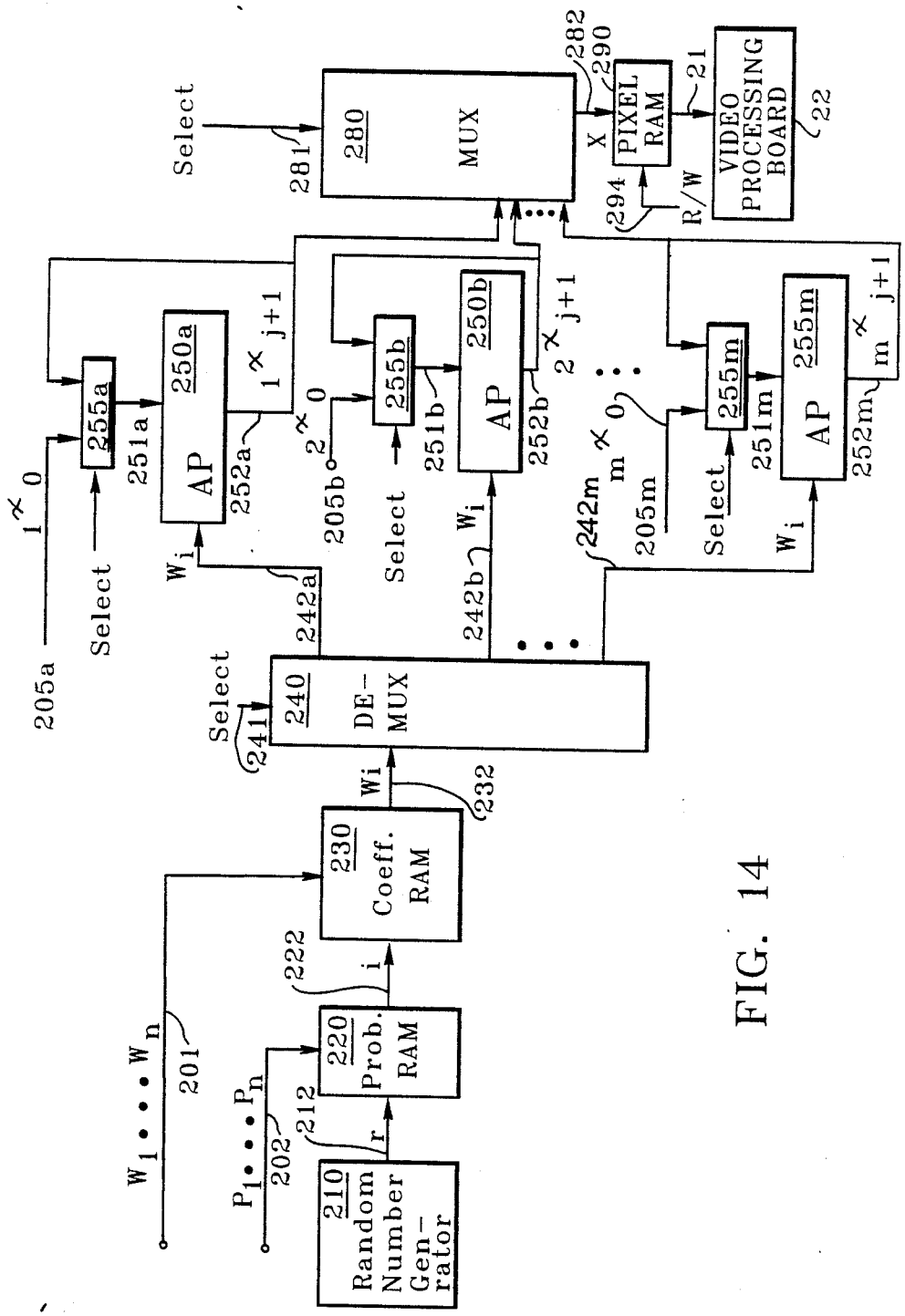

FIG. 14 is a block diagram of the preferred embodiment of a parallel processor for decoding images in accordance with the random iteration decoding method.

FIG. 15 is a pseudocode listing of a program for driving the preferred random iteration parallel processor of FIG. 14.

FIG. 16 is a block diagram of the preferred embodiment of a parallel processor for decoding images in accordance with the set or deterministic iteration decoding method.

FIG. 17 is a pseudocode listing of a program for driving the preferred set iteration parallel processor of FIG. 17.

Figure 18A:
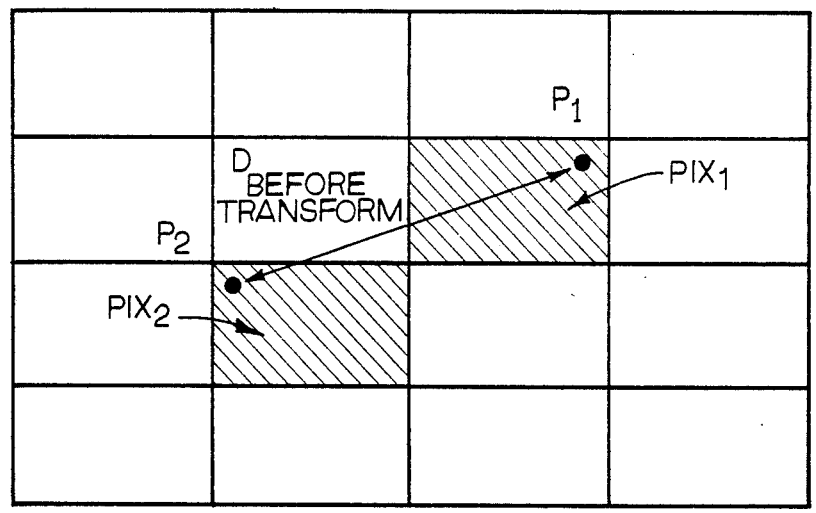
Figure 18B:
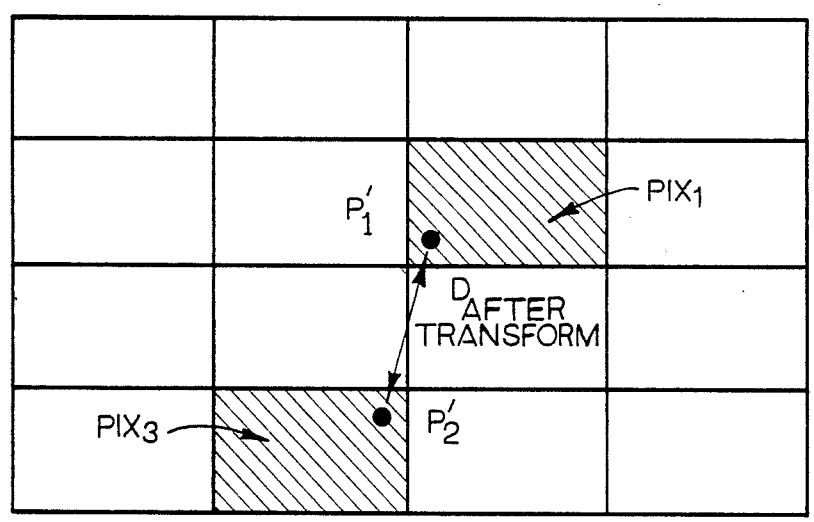

FIG. 18, consisting of FIGS. 18A and 18B, illustrates a mapping which appears on a display screen as expansive but is mathematically contractive.

Figure 19:
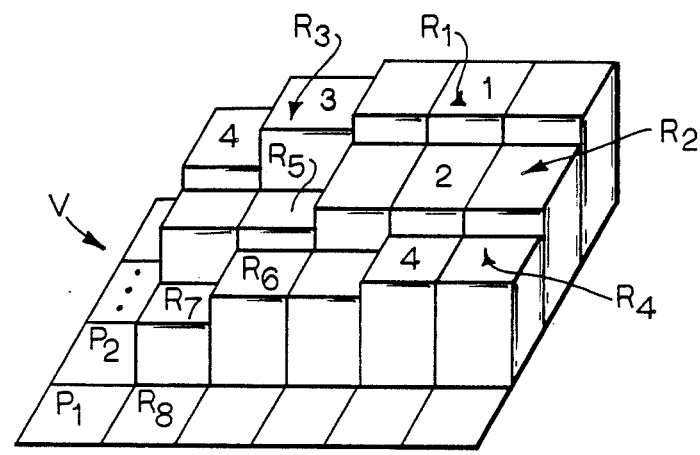

FIG. 19 graphically illustrates the assignment of a measure to a pixel location, used for the pixel visitation frequency method for representing color information.

FIG. 20 illustrates several examples of rendering values assignment functions.

FIG. 21 illustrates different segments or regions in an exemplary image which have characteristics in common and are treated as a unit when being compressed in accordance with the present invention.

DETAILED DESCRIPTION OF THE PREFERRED EMBODIMENT

The preferred embodiments of the present invention, illustrated in the several figures, are methods, and apparatus which carry out the methods, for employing iterated function system mathematics to produce highly compressed data streams which may be used to exactly reproduce an original input image. The methods and apparatus are particularly useful for image compression for storage or communication, high speed reproduction of high resolution for commercial and military flight and/or vehicle travel simulation, pattern recognition, and other applications which require image compression. The following detailed description will first address the mathematics underlying the operation of the preferred and disclosed embodiments, which are the best modes presently known by the inventors for carrying out the inventions, and will then turn to discussion of the particular embodiments.

MATHEMATICS OF ITERATED FUNCTION SYSTEMS (IFS)

Because the methods and apparatus of the present invention are mathematically and computationally complex, before turning to a detailed description of the disclosed embodiments an explanation of the underlying mathematics will be presented.

One primary objective of the present invention is to develop a system whose input is a data string, corresponding to a two-dimensional array of numerical attributes of a digitized picture, and whose output is a shorter string from which the original can be regenerated exactly. However, it should be understood that the inventions described herein can also be used for inexact or approximate image regeneration, in applications where exact images, or images having reduced resolution, are satisfactory. In some applications, inexact compression and reproduction may be desirable to gain additional compression, speed of transmission, or rapidity of compression.

OVERVIEW OF FRACTAL GEOMETRY

The purpose of this section is to generally introduce the mathematics of IFS and to show how they can be applied to the construction of geometrical models for physical structures. Euclidean geometry works well to describe the conformation of elements in a man-made structure such as as building. However, it is an inefficient tool for modeling the placement of a quarter of a million pine needles on a pine tree. The basic tools of Euclidean geometry are readily available, for example a straight edge, compass, and some knowledge of how to define equations for lines, circles, etc. in the Cartesian plane. It is believed by the inventors that many images of the real world are more readily, usefully and accurately represented using their particular version of fractal geometry than by Euclidean geometry. Accordingly, herein will be presented the basic tools for working with fractal geometry.

Some definitions and caveats are in order. By a "fractal" we mean here any subset of R (which denotes spatial dimensions; typically n=2,3, and 4) which possesses features which are not simplified by magnification (observation at successively higher visual resolution). In two dimensions a location on a set is simplified by magnification if it reveals a straight line segment or isolated point in the asymptotic limit of infinite magnification. This definition is different from the usual one that the Hausdorff-Besicovitch dimension of the set exceeds its topological dimension.

It should be noted as an aside that a set such as a Sierpinski triangle or classical Cantor set, which is made exactly of "little copies of itself", is likely to be a fractal, but in the sense and spirit with which we use the word, it would be a very special case. The fractal geometrical models which we describe here are, in general, much more complicated. Features which are apparent at one location may not be present at other locations nor retrieved upon closer inspection.

The operation of the present invention concerns deterministic geometry. Thus, any model produced will always be the same subset of $R^n$ however many times it is regenrated. We are not concerned with random fractal geometries. Interest in the latter resides in their statistical properties; deterministic fractals may be used to model the exact structure of a specific object over a range of scales. This contrasts with the approach taken by many in the art of computer graphics to generate some type of image with stochastic fractal geometry, instead of attempting to model and represent a given image.

All geometrical models for physical entities are inevitably wrong at some high enough magnification. An architect's drawing of a straight line representing the edge of a roof breaks down as a model if it is examined closely enough. On fine enough scales, the edge of the roof is wriggly while the (intended) drawing remains endlessly flat. Fractal geometry can provide a better model for the edge of the roof; the model may appear as straight at one scale of observation and to have the right kind of wriggliness at another; but in the end it too will be wrong because of the dual nature of matter.

The terminology "iterated function system" (IFS) describes a convenient framework for understanding fractal geometry. This name includes reference to the fact that an IFS has much in common with a dynamical system. Let K denote one of the spaces $R^n$ ($n=2,3$, or 4). Let W: K→K be a continuous mapping. For example, with $n=2$, we will usually be concerned with mappings of the special form:

$$W\begin{pmatrix}x\\y\end{pmatrix} = \begin{pmatrix}a & b\\c & d\end{pmatrix}\begin{pmatrix}x\\y\end{pmatrix} + \begin{pmatrix}e\\f\end{pmatrix}$$ (EQUATION 1)

Figure 5:
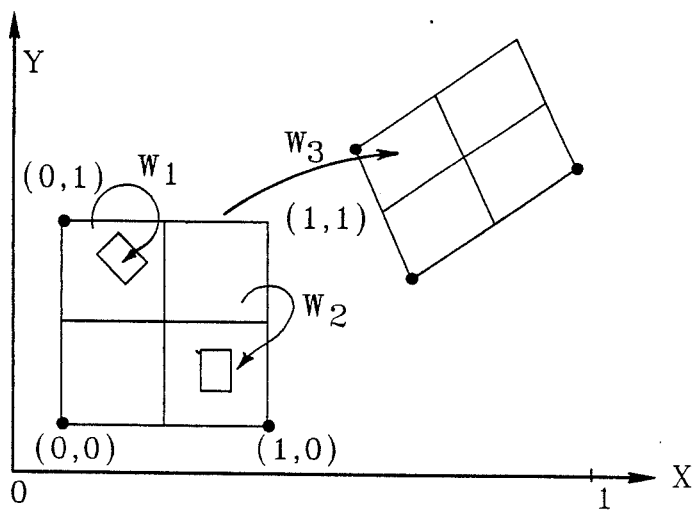
FIG. 5 illustrates an affine transformation applied to an exemplary two-dimensional graphic object (a square), mapping it to a parallelogram.

The symbols a, b, c, d, e, and f are real constants or coefficients which specify the transformation. Six numbers completely represent such a two-dimensional transformation. Here (x,y) are the coordinates of a point before the transformation has been applied, and (ax+by+e, cx+dy+f) are the coordinates afterwards. Such a transformation is said to be "affine" because it takes straight lines to straight lines. For example, W will typically map a square to a parallellogram, as illustrated in FIG. 5.

A continuous mapping W: K→K is said to be mathematically "contractive" if it always decreases the distance between points. Let the distance between two points x and y in the space K be denoted $|x-y|$. Then W is contractive with contractivity factor "S" such that $0 \leq S < 1$ if $$|W(x) - W(y)| \leq S|x-y|$$ (EQUATION 2)

for all pairs of points (x,y) in K. For example, the affine map described above will be contractive if the numbers a, b, c, and d are sufficiently small. A suitable choice would be $a=0.7$, $b=0.1$, $c=0.3$, and $d=0.5$.

The space K together with a finite set of continuous contractive mappings W: K→K, say $W_1, W_2, \ldots W_n$ provides an example of an iterated function system (IFS). Here is an example of an IFS with $N=2$:

$$W_1\begin{pmatrix}x\\y\end{pmatrix} = \begin{pmatrix}.2 & .3\\-.1 & .5\end{pmatrix}\begin{pmatrix}x\\y\end{pmatrix} + \begin{pmatrix}-.1\\18\end{pmatrix};$$ (EQUATION 3)

$$W_2\begin{pmatrix}x\\y\end{pmatrix} = \begin{pmatrix}.1 & .5\\.7 & .1\end{pmatrix}\begin{pmatrix}x\\y\end{pmatrix} + \begin{pmatrix}-1.4\\109\end{pmatrix}$$

Each map has associated therewith a probability, the purpose for which will be described later. Thus, there is always associated with a map $W_n$ a probability $P_n$, such that $P_1 + P_2 + \ldots + P_n = 1$. In the last example we might choose $P_1 = 0.39$ and $P_2 = 0.61$. In decoding a data stream represented by a set of transformations, there is a probability $P_n$ that each of the maps $W_n$ will be chosen for use in the decoding method.

As mentioned above, the terminology "iterated function system" or "IFS" merely describes a convenient framework for understanding fractal geometry. This name includes reference to the fact that an IFS has much in common with a chaotic dynamical system. Basic work relating to this framework originated with one of the present inventors hereof, Michael L. Barnsley, and a colleague Stephen Demko, and has been explored to lesser degrees by Hutchinson, Moran, Diaconis and Shashahani, and Dubins and Freedman.

The above described transformations are said to be affine because they take straight lines to straight lines. For example, W will typically map a square to a parallelogram, as illustrated in FIG. 5. The fundamental tool of fractal geometry, which allows one to write down formulas for fractal sets, is the following theorem.

THEOREM ON EXISTENCE

Let $\{K, W_1, W_2, \ldots, W_n\}$ be an IFS where each mapping W is contractive with contractivity factor S (such that $0 \leq S < 1$). Then there is exactly one nonempty closed bounded set A ⊂ K so that $$A = \bigcup_{n=1}^{N} W_n(A)$$ (EQUATION 4)

Here we use the notation $W_n(A)$ to mean the image under $W_n$ of the set A; it is the same as the union of the images of all points in A under $W_n$. A set $R^n$ is bounded if it is contained in an n-dimensional sphere of finite radius. A set in $R^n$ is closed if it contains all its boundary points. The set A is defined mathematically as the "attractor" of the IFS. The reason for A being called the attractor is that A is the pattern that emerges when the IFS applies the affine transformations to points in space in accordance with the method for decoding described below.

Figure 4:
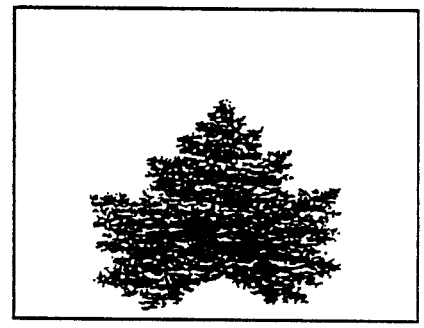
FIG. 4 illustrates the attractor for the affine transformations of FIG. 3.

An example of an attractor of an IFS is shown in FIG. 4. It corresponds to four affine maps and is specified by twenty-four numbers. Attention is directed to the following features. (1) The image as a whole is not self-similar; it is not the disjoint union of uniformly shrunken copies of itself. In other words, a magnified view of the picture will not reveal exact copies of the original. (2) The image does contain features which recur under affine deformation. For instance, there are various different types of large holes in the image, and skewed smaller versions of these do appear. (3) The image is a fractal in the sense defined above; it contains features which are not simplified by magnification. (4) The image represents the results of substantial data compression. Treat the set as data on a 1000×1000 grid. Uncompressed, a string of $10^6$ zeros and ones is needed to store or transmit the image. Compressed using an affine IFS, it can be represented exactly using twenty-four eight-bit numbers, which requires $(24)(8) = 192$ bits, yielding a compression ratio of 5,208:1, or 0.000192.

For most applications, some additional information is required to represent the residual of the image, that is, those portions of the image which are not found in the collage of the maps. Moreover, each of the maps is assigned a probability, so that in actuality there are seven eight-bit numbers required to represent each affine map. More information on these additional requirements is provided later.

It has been discovered by the inventors that the contractivity condition specified above, namely, $0 \leq S < 1$, need only be approximately satisfied in order for the Theorem on Existence to be operable. This means that contractive mappings which are only contractive to a mathematical precision approximately the same as the resolution of a given image or mapping are sufficient for images at that resolution to be reproduced. It is believed that this discovery is a significant factor in allowing the construction of image encoding and decoding apparatus, since it is of course impossible to construct apparatus which operates with infinite precision arithmetic.

THEOREM ON COMPUTING THE ATTRACTOR OF AN IFS

There are two methods for determining the attractor of an IFS, which, as has been described, is the resultant image after decoding the IFS codes. These are (1) the random iteration method, and (2) the set or deterministic iteration method. Each method is implemented on a digital computer to compute and generate an output image based on a set of input IFS codes.

RANDOM ITERATION METHOD FOR COMPUTING THE ATTRACTOR

First will be described the random iteration method. Let $\{K, W_1, W_2, \ldots, W_n\}$ be an IFS where each mapping $W_n$ is contractive with contractivity factor S, such that $0 \leq S < 1$. We use the notation x for a point in a compact space K. In the first or random iteration method, let $x_0$ K. Choose inductively for n=0, 1, 2, . . ., $x_{n+1}$ $\{W_1(x_n), W_2(x_n), \ldots, W_N(x_n)\}$, where probability $P_m > 0$ is assigned to the choice $W_m(x_n)$. For example, in the case N=2, one might choose $P_1 = P_2 = 0.5$ and use an unbiased coin toss to decide which map $W_1$ or $W_2$, is to be applied at each next step. Then with total probability of one, the limiting set of points derived from the sequence $\{x_0, x_1, x_2, \ldots\}$ will be the attractor A of the IFS.

In other words, this states that each of the maps, which are sets of IFS codes, are chosen at with a random number generator, but certain sets have a greater likelihood of being chosen because of the probability assigned to the IFS code. As will be described in greater detail hereinbelow, certain sets of the maps or IFS codes are assigned higher probabilities than others. In particular, this method is used for carrying color information, in that maps having a particular probability of choice represents a particular predetermined color.

DETERMINISTIC METHOD FOR COMPUTING THE ATTRACTOR

A second method for computing the attractor is as follows. Let $A_0$ be any nonempty subset of K. Define $A_m$ as follows:

$$A_m = \bigcup_{j=1}^{N} W_j(A_{m-1}) \quad \text{(EQUATION 5)}$$

for m=1,2,3, . . . . Then the sequence of sets $\}A_0, A_1, A_2, \ldots\}$ converges to the attractor A of the IFS.

Next will be described how these methods are implemented in algorithms for implementation in a computer. As an example, let N=2, and S=0.5. Suppose that both affine maps $W_1$ and $W_2$ take the unit square with corners at (0,0), (1,0), (1,1), (0,1) into itself, as illustrated in FIG. 5. Consider the implementation of the algorithm on a graphic display screen of resolution 100 by 100 pixels. Let B denote the digitized version of A on this 100 by 100 grid. On applying the random iteration algorithm in this framework, it will be noted that all the x's after a certain number will lie on B. To find how many iterations H are required, the following formula is solved for H:

$$S^H = R \quad \text{(EQUATION 6)}$$

where S is the contractivity factor, R is the resolution, and H is the number of iterations. In the present case S=0.5, R=0.1, and thus H<7. Hence, if we choose x=(0.3, 0.8), which lies inside the unit square, and we skip the first seven points, then all of the subsequent points $\{x_7, x_8, x_9, \ldots, x_\infty\}$ will lie on B. Moreover, if we simply plot $\{x_7, x_8, x_9, \ldots, x_{1,000,000}\}$ then it is very likely that every point in B will have been plotted.

In practical IFS systems, a plurality of sets of IFS codes will represent an input image. Each these sets will have associated therewith a contractivity factor S. It will therefore be appreciated that the number of iterations H is a function of the largest S of a given set of input IFS codes. For each matrix of IFS codes which, in the two-dimensional case contain six numbers, the contractivity factor for a given set of IFS codes A is calculated with the following formula:

$$S = |W(x) - W(y)| / |x - y| \quad \text{(EQUATION 7)}$$

for each pair of points (x,y). The preferred way to compute the contractivity factor S is with a point by point computation, similar to that of a Hausdorff distance computation (see Equation 8), but those skilled in the art will understand that there are other, well known methods for approximating this computation.

Figure 1:
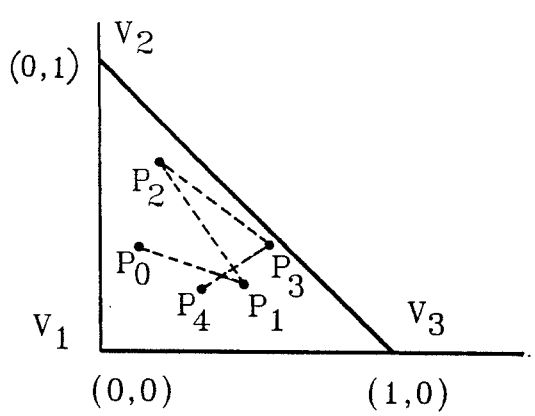
FIG. 1 illustrates a chaotic dynamical system with an iterative procedure having three possible affine transformations for generating a graphic object.
Figure 2:
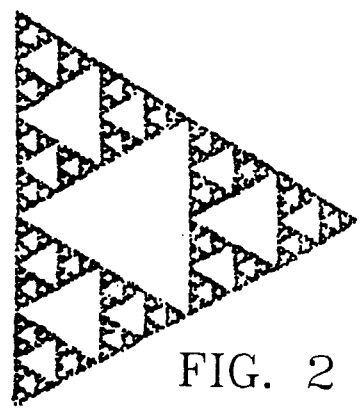
FIG. 2 illustrates the outcome of the iterative procedure performed in connection with FIG. 1, a Sierpinski gasket.
Figure 3:
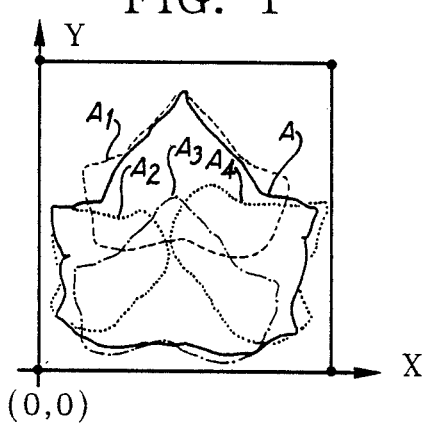
FIG. 3 illustrates a plurality of four affinely transformed copies of the object input image collaged or overlaid on an exemplary two-dimensional graphic object input image, a leaf.

It should be noted that in this case, the probabilities of choosing each of the two maps was also 0.5, i.e., it was just as likely that one of the two maps was chosen as the other. If different choices are made for $P_1$ and $P_2$, say $P_1 = 0.25$ and $P_2 = 0.75$, then exactly the same set B will be obtained in the end, although the system may have to plot many more points before the complete set is plotted. This is especially true if one of the P's is very small. An incomplete rendition of the digitization of an attractor for the leaf of FIG. 3 is shown in FIG. 4.

We use the same setting as in the previous paragraph to illustrate the practical implementation of the deterministic algorithm. It is convenient (and permissible when S<0.5) to work directly with the graphic display screen pixel elements in place of points in the plane. In place of the sequence $A_0, A_1, A_2, \ldots$ we use a corresponding sequence of subsets $B_0, B_1, B_2, \ldots$ of the 100 by 100 digitization grid. Then $B_0$ is any subset of elements of the grid. For example, $B_0$ may be the whole grid or just a single element of it. The notation $B_{m+1} = W(B_m)$ is used to mean the result of calculating the images of all real points corresponding to $B_m$, then projecting the result back onto the discretization grid. In our framework, we would find $B_7 = B$, i.e., the attractor stabilizes after seven iterations. Moreover, it will be understood that $B_7 = B_8 = B_9 = \ldots$, which means that further iterations are unnecessary.

In other words, a beginning or initial image, which may be totally meaningless, is formed, for example in a screen buffer memory or on the display screen itself. Each element in the screen buffer is "operated upon" with each of the affine transformations of the IFS codes and the screen buffer is replaced by the results. (An interim holding buffer is utilized in the preferred embodiment so that the original starting image is preserved until an iteration is complete). And again, the process is repeated by operating upon the elements in the screen buffer and replacing same with the results. This process is repeated until the attractor emerges.

Moreover, the operation need not be on each and every element in the screen buffer for each iteration; a subset of elements may be chosen for operation. That particular selected subset is replaced with the results of the transformation operation, prior to repeating the application of the transforms, etc. The attractor still emerges and stabilizes. Accordingly, it will be understood that an arbitrary starting image may be utilized, of an arbitrary size and location, and a plurality of different subsets may be chosen and independently operated upon. This enables the parallel processing embodiment described below. Each parallel processor starts with a different starting image, is provided with the same set of IFS codes, and independently transforms its starting image. When a sufficient number of iterations has been completed so that the union of the operations by the parallel processors meets the display resolution limit, the results are combined to produce a final image.

FIGS. 6A-6J show a sequence of sets computed using the set or deterministic iteration algorithm starting from $B_0$ defined by the black square in the upper left corner of FIG. 6A. The black square is the initial image, and has no meaning other than it is a positive element which can be affinely transformed with the IFS codes. This time there are four affine maps in the IFS. As can be seen in the figure, because of the contractivity condition and the fact of four affine maps, in each successive view there are four times as many squares as in the previous frame, and the sizes of the squares are successively smaller. For example, in FIG. 6B there are four squares, each of which are smaller than $B_0$, and each of which are distorted copies thereof. And in FIG. 6C, there are sixteen squares, since the four affine transformations have been applied to the four distorted squares in FIG. 6B. When the resolution of the screen has been reached by the largest square, the iteration is for practical purposes complete. The attractor is seen in FIG. 6J, and in this instance is a geometrical model for a branch of a Black Spleenwort Fern.

THEOREM ON FINDING THE MAPS (COLLAGE THEOREM)

The discussion thus far has focused on a way of associating an often elaborate geometrical set with a brief set of numbers which defines an IFS. In other words, the foregoing provides a method and means for generating an image given a set of IFS codes. However, the goal is to be able to determine an IFS which represents a given structure. For example, given a scene of Mount Rushmore set against a blue sky mottled with clouds, how does one go about finding the IFS codes for representing this picture? This contrasts with conventional fractal modeling wherein a structure having known features at various scales (i.e., a generalized mountain or clouds) is modeled but not a particular given input structure.

To give an idea of how this may be achieved, consider a simple analogous two-dimensional problem: find an IFS whose attractor approximates the leaf image A shown in FIG. 3. First, we need to understand the concept of the distance between two closed, bounded sets U and V in say, $R^2$. We use the Hausdorff distance $H(U,V)$, which is defined as:

$$H(U,V) = \max\{D(U,V), D(V,U)\} \quad \text{(EQUATION 8)}$$

where $$D(U,V) = \max\{\min\{|u - v| : u \in U\} : v \in V\}.$$

For example, let U denote the real interval $1 \leq x \leq 4$ and let V denote the real interval $0 \leq x \leq 2$. Then, $D(U,V)=1$, $D(V,U)=2$, and the Hausdorff distance between the two sets is 2. The important point is that two closed and bounded sets are more and more nearly the same set the smaller the Hausdorff distance between them. In saying that they are nearly the same, we mean that they look alike at a fixed resolution. Stated in yet other words, an acceptable or satisfactory set of IFS codes for a given input image has been found when the Hausdorff distance between the given input image and the image reproduced by decoding a set of IFS codes is a minimum for the resolution of the display screen.

It is also considered an advantage provided in the present invention that the IFS representations are stable. The method and means described herein are stable in the sense that small changes in coefficients in the IFS codes correspond to small changes in the decoded data. This robustness is not shared by other commonly used exact compression codes known in the art. Accordingly, it will be appreciated that small errors in the codes, which may result from errors in transmission or storage of the codes, or from the precision of the arithmetic employed in calculating the codes, yields small errors in a decoded picture. In many instances, if the errors are small enough, there will be an imperceptible distortion in the decoded picture.

The Hausdorff distance between two images may also be thought of as a potential energy. The larger its value, the more different are the two images. If the energy is low, then the two images are very much alike, and if it is zero, then the two images are the same. The Collage Theorem is the basic theorem which allows the combination of IFS codes to represent the original input image. Let $\{K, W_1, W_2, \ldots, W_n\}$ be an IFS acting in a compact space K, where each mapping $W_n$ is contractive with contractivity factor S, such that $0 \leq S < 1$. Let L be a given (closed bounded) subset of K. Suppose that the maps have been chosen so that the Hausdorff distance between L and the union of the images of L under all of the $W_n$'s is smaller than E. Then, the Hausdorff distance between L and the attractor A of the IFS will be smaller than $E/(1-S)$. In other words, the closer L is to $$\bigcup_{j=1}^{N} W_j(L),$$

the closer A is to L.

We illustrate this theorem with the sketches in FIG. 7. In FIG. 7A, the target set L is the line segment [0,1], whose images under two affine contractive maps are line segments each of length 0.5; the Hausdorff distance between L and the union of its images is about 0.5. The attractor is the squiggily entity and its Hausdorff distance from L is about 1. In FIG. 7B, the images of the line segment are closer to L, and the attractor is proportionately closer as well. In FIG. 7C, the target L is indistinguishable both from the union of its images and from the attractor of the corresponding IFS.

Finally, we are able to see how to design an IFS of affine maps whose attractor models the branching structure in FIG. 8A. Three affine maps $W_1$, $W_2$, and $W_3$ are required; they are determined by the requirement that they take the whole image to the three components parts shown in FIG. 8B. Although there may be errors in the calculation of the maps, and although the image is not exactly the same as the union of the three images of it under them, the Collage Theorem assures us that the attractor will be a reasonable model for the original target.

Stated in other words, the Collage Theorem says that to find the IFS compression code for a leaf image, one must solve a jigsaw puzzle of the following type. Small deformed copies of the leaf (deformed under affine transformation) must be arranged so that they cover up the original leaf as exactly as possible. The better the "collage", the closer will be the attractor of the corresponding IFS to the original leaf. An equally simple theorem governs the control the invariant measure of an IFS. Again, the same principle applies for attractors of recurrent IFS and consequently allows the means and methods described herein.

It should be understood and appreciated that small changes in the parameter values or IFS codes yield only small changes in the resultant expanded or decompressed image. This contrasts markedly with the prior art usage of random recursive refinement algorithms to produce terrain models, stochastic procedures to produce clouds and textures, and random branching and growth models for plants. In all of these prior art methods, the final product image depends on the precise random number sequence called during computation. The lack of such dependence in the method claimed herein is important for system independence, interactive usage, and animation. Furthermore, it will be appreciated that images vary consistently with respect to changes of viewing window and resolution. Images can be generated to a very high resolution, or equivalently viewed within a small window, without undesirably reducing to blocks of solid color.

SYSTEM FOR ENCODING IMAGES

Referring now to the drawings, in which like numerals indicate like elements throughout the several views, there is illustrated in FIG. 9 the preferred embodiment of an image compression system 10 constructed in accordance with the present invention. The system carries out the methods described herein for compressing an original input or target image, determining a set of IFS codes representing an approximation of the image, decoding the approximation in order to obtain an image approximation, comparing the target image with the approximation image, and determining the corrections for the IFS codes in order to minimize the Hausdorff distance between the original input image and the approximation image.

The preferred embodiment of the system 10 comprises a microcomputer-based controller 12 which carries out the computations necessary for performing the affine transformations on the target image. The controller 12 in the preferred embodiment is an IBM PC/AT or equivalent microcomputer system. Preferably, a control device such as a mouse 14 is employed so as to assist in the movement of the graphic objects representing the affine transformations on a display screen 15. For example, a graphic image A is shown in FIG. 9 together with a distorted, contractive "copy" A' of the image A. The controller 12 is programmed to generate the contractive copy A', perform an affine transformation of the contractive copy to obtain the contractive copy A', and position the copy A' with respect to the original object A responsive to movements of the mouse 14.

After the discussion above, it will of course now be understood that the numbers representing the affine transformations are stored for subsequent use and comprise the IFS compression codes. In the preferred embodiment, a random access memory 15 is provided for storing the IFS codes. As an example, the IFS codes from Equation 1 above would be represented by the coefficients (a, b, c, d, e, f).

It should be mentioned at this point in the discussion of FIG. 9 that the method for obtaining an optimum set of IFS codes is itself an iterative process. Accordingly, the preferred method of obtaining such an optimum set of IFS codes comprises taking the IFS codes representing the original input image and decoding them to form an approximation of an image, and adjusting the IFS codes until the approximate image is sufficiently close to the original input image. Thus, the preferred embodiment of an image compression system 10 includes a decoder 20, which is described in greater detail in connection with FIGS. 10 and 11. The decoder 20 is also known as an "iterated function system image synthesizer" or IFSIS, because it is useful to produce images in response to being provided numbers which represent IFS codes. In fact, the IFSIS decoder 20 will produce images even if it is provided meaningless numbers as inputs; of course, its principal utility is to produce decoded images in response to being provided IFS codes which were obtained by compressing an input image.

The output of the decoder 20 is a video signal provided on line 21 and is provided to a screen buffer memory 22 for storing the image approximation. The contents of the screen buffer 22 are then provided to the display screen 15 and to a comparator 24, which is operative to compare the original input target image to the approximation image stored in the screen buffer 22. The preferred comparator 24 operates to compare the input image to the approximation image and to provide a set of error codes on line 25. In the case of automated encoding, the comparator computes the Hausdorff distance between an input image and an image produced by the decoder 20, and the error codes represent an adjustment to be made to the affine maps (e.g., if the error is large, additional affine transforms are needed, or the tiling is such that significant areas are poorly covered and movement is needed). In the case of manual encoding, the "comparator" is an operator who makes a subjective judgment that the target image and the decoded image are too far apart.

The controller 12 is responsive to the error codes to perform adjustments to the IFS codes so that the approximation image is a better match to the original target image. In the case of manual encoding, the operator makes additional affine copies and/or adjusts the tilings to make a better fit of the collage of affine copies with respect to the target image.

Because the preferred system for encoding images employs a decoder 20, before describing the methods for encoding images, it is believed that it will be clearer to first describe the preferred decoding methods. The decoding methods and apparatus operate on the assumption that a given set of IFS codes are provided and are to be decoded to form an image. The manner in which the encoding was performed is irrelevant to the decoder.

PREFERRED IFS DECODING METHODOLOGIES

There are at least two different methodologies for decoding a given set of IFS codes to generate images. The first is a random iteration method, wherein the IFS codes, which are weighted with a predetermined probability, are selected at random and applied to a point. A second method is called the "set" or "deterministic" method (even though both methods are deterministic in the sense that both methods stabilize to a given attractor), and involves the sequential and iterative application of the given set of IFS codes to an initial image until the attractor stabilizes. The former method gives rise to a method for color rendering, based on the frequency of visitation of a particular point in the display space.

RANDOM ITERATION DECODING

To address the proposed modeling and rendering problems, two IFS methods are disclosed. They are (1) an interactive geometrical modeling method for finding iterated function system codes, and (2) a random iteration algorithm for computing the geometry of, and rendering, images starting from IFS codes. The first method is based on the Collage Theorem, as described hereinabove. It provides a means for interactive two-dimensional geometric modeling using IFS, and is suitable for implementation with the decoder 20 described below. The input is a two-dimensional target image, for example a polygonal approximation to the boundary of a leaf. The output from the algorithm is an IFS code which, when input to decoding algorithm, provides a rendition of the original target. The closeness of this rendition to the desired image depends on the efficiency with which the user or operator is able to solve interactively a certain geometrical problem.

The random iteration method is based on an extension of the mathematical theory of IFS which permits the use of transformations which do not shrink spatial distances. It starts from an input IFS code, and with the aid of random iteration produces a deterministic geometrical object together with rendering values. Despite the use of random iteration, a unique final image is obtained once the viewing window, resolution, and a color assignment function have been specified.

The method should now be apparent to those skilled in the art, after the preceding framework and discussion. An initial point is chosen, at random, for operation. The IFS codes are provided to the decoder, together with the probability assigned to each set of IFS codes representing a single contractive affine transformation. A random number is generated and employed to select one of the sets of IFS codes. It will be recalled that the probability of selecting one of the plurality of sets of IFS codes equals the probability associated with that set. The initial point is transformed in accordance with the selected IFS code. The resultant location of the point after the transformation is stored in memory.

Another IFS code is randomly selected, and used to transform the previous point, it being recalled that each transformation operates upon the resultant location from the preceding transformation. These iterations are successively repeated. After a predetermined number of iterations, a picture element associated with the stored location of the point is displayed (or, a bit is set in the corresponding location in a display screen memory). In other words, the results of a first predetermined number of iterations are not displayed, in order to allow the attractor to begin stabilizing and to prevent the display of points in the output image which are randomly distant from the attractor's geometric location in the display space. The attractor stabilizes after a second minimum predetermined number of iterations, which must be large compared to the number of pixels in the display space.

The random visitation of points in display space, which is weighted by the probabilities assigned to the IFS codes, provides a convenient technique for encoding color information, as will be described in more detail later. The fact of illumination of a point in display space (or the setting of a bit in the display screen memory) is registered as a "hit", and the hit count for the corresponding display screen location incremented. After the terminal or second predetermined number of iterations, the hit count numbers are retrieved from the hit count memory and employed as indices into a color array. Each possible color is represented by a different number. In the preferred embodiment, which uses eight bit codes for color, 256 different colors (or gray scales, if preferred) are possible. The color corresponding to the hit count value is selected, and displayed at the particular pixel location associated with the particular hit count value.

SET OR DETERMINISTIC DECODING

The other principal method employed in the preferred embodiment for encoding images in the set or deterministic method. As will be recalled from the discussion above, this method entails the iterative application of each of the plurality of IFS codes to an image; the starting image may be a random image.

Again, after the discussion above, the method should be apparent to those skilled in the art. An initial, even random starting image is formed in display space; in the preferred embodiment, a predetermined geometric form such as the square in FIG. 6 is stored in the display screen memory. Each of the IFS codes provided as inputs are successively applied to the starting image. The results of the plurality of transformations are stored in a memory. The results of a first predetermined number of iterations are not displayed, but are stored. After this first predetermined number of iterations, the results may be displayed. In the preferred embodiment, no results are displayed until the attractor has stabilized.

The process of the successively applying each of the IFS code inputs to the previous image is iteratively repeated until a second predetermined number of iterations. The second predetermined number in the preferred method corresponds to the time when the largest object has been contracted to the screen resolution. This is easily calculated by (1) determining the particular one of the input set of IFS codes which produces the least reduction or contraction of the starting image object (the square of FIG. 6 for example), and (2) calculating the number of iterations required to reduce the starting object to a size less than or equal to the display screen resolution by repeated and successive applications of this largest coefficient.

After the second predetermined number of iterations, the results stored in the display memory are displayed.

PREFERRED DECODER APPARATUS

Turning next to FIG. 10, the preferred decoder 20 comprises a digital matrix processor 30 and an iterated function system (IFS) interface circuit 40, also called the IFSIS board. These two primary components operate to decode a set of a plurality of affine transformation coefficients and to transfer the results of the decoding process to the screen buffer 22, which in the preferred embodiment is a video processing board which includes a screen buffer memory. Both the digital matrix processor 30 and the IFS interface 40 are connected to the PC data bus 16 for receiving commands and data. The preferred digital matrix processor 30 is a type ZR73301 digital filter processor board (DFPB) manufactured by Zoran Corporation, Santa Clara, Calif. Details concerning the operation of the preferred digital matrix processor 30 are available in the literature supplied by the manufacturer. The digital matrix processor 30 includes a plurality of digital filter processor circuits which are capable of performing matrix multiplications at very high speed.

It will be understood that while the digital matrix processor 30 employed in the preferred embodiment is capable of serving as a general purpose digital filter, the purpose for which it is used in the present invention is to provide high speed matrix multiplications. Accordingly, it will be understood that the other functions provided on the digital filter processor board are not employed in the preferred embodiment. In particular, the digital matrix processor is configured for operation wherein a plurality of 8-bit precision coefficient values are provided by the controller 12 as the inputs to the decoder 20, which is responsive to perform matrix multiplications upon a set of pixel data representing an image.

In the disclosed embodiment, the data set representing an image is an array 256 pixels by 256 pixels, although it will be appreciated that the size of this array is arbitrary and that a larger array gives rise to greater resolution. Moreover, it should be understood that the data set representing the image is the same for the display resolution, the screen buffer resolution, and for all matrix computations involving the array. In other words, because of the discovery that approximated calculations based on a given input resolution are sufficient for reproducing images at the same resolution, the image is represented at an initial resolution of 256 by 256, and then manipulated, encoded, stored, and reproduced at this same resolution.

The digital matrix processor 30 is connected to the IFS interface circuit 40 to provide signals labelled DATA OUT, and receives back from the IFS interface 40 signals denominated DATA FEEDBACK and COEFFICIENTS. The output of the IFS interface 40 comprises the signal labelled VIDEO DATA; these data represent the pixels of a display image, and are converted to RGB video signals for display. The signal VIDEO SYNC is received back from the video processing board 22. These signals are collectively illustrated as being carried on the lines 21.

The preferred video processing board 22 is a type PIP video digitizer board model 289-MH-00 manufactured by Matrox Electronic Systems, Ltd., Dorval, Quebec, Canada. Details concerning the operation of the preferred video processing board 22 are available in the literature supplied by the manufacturer. Generally, the video processing board 22 is a circuit which allows the IBM PC microcomputer controller 12 to perform frame grabbing operations on a video signal from an external source. The preferred circuit provides a resolution of 512×512 pixels in normal operation, with eight bits of color information per pixel. However, in the disclosed embodiment, the image size is 256×256 pixels, with 8 bits of color information.

The circuit 22 includes an on-board frame buffer memory which is loaded in response to commands by the controller 12. Alternatively, video data can be written directly to the video processing circuit from the controller 12. Pixels can be individually addressed by the controller using X and Y address registers. In addition to providing data representing the frame on the data bus 16, the video processing board 22 provides an RGB color video output, which is directly displayed on the monitor 15.

FIG. 11 is a more detailed schematic diagram of the IFS interface card 40 employed in the decoder 20. Signals from the IBM PC/AT controller 12 are provided on lines 16 to a PC interface circuit 41, which receives and transmits control and data signals from the microcomputer in the known manner. Emanating from the PC interface circuit 41 is an IFS interface board data bus 42 which is connected to various other circuit components. Commands from the controller 12 are provided on lines 43 as PC COMMANDS to a microprogram controller 44. The microprogram controller 44 is a state machine which enters various operational states and provides corresponding outputs as a function of the current state. A sequence of addresses is provided on lines 45 to a microprogram memory 46, a random access memory (RAM) in the preferred embodiment for ease of program modification, which provides control and timing signals on lines 47 as an output to the various functional blocks in the circuit.

Data corresponding to the IFS codes are received on lines 31 from the digital matrix processor 30. Lines 31 are provided to pixel address register circuits 51 and to feedback register circuits 52. Both of these registers 51, 52 are conventional digital registers. The pixel address registers 51 contain the current address of a pixel being examined or processed during operation of the IFS interface circuit 40. This address information is provided on lines 53 to a hit count circuit 55 and to a pixel random access memory (RAM) 56; the functions of these circuits is described later.

It will be recalled from the earlier discussion that the present invention operates by iteratively transforming an initial image to obtain a second image; the values of various picture elements are a function of an earlier value. This second image in turn is transformed to a third image, and so on. Accordingly, image data must be fed back through the system to effectuate repetitive iterations. The feedback registers 52 receive data from the digital matrix processor 30 and temporarily store the values of certain pixels for subsequent use; the data are provided out to the data bus 42 and through the PC interface 41 back to the digital matrix processor 30. This permits the numerical monitoring of the operation of the device for testing. The digital matrix processor has an internal feedback loop which can supply its data needs at clock speeds.

As has been described above, the present invention is capable of selection for operation with either of two different methods for representing color information and for performing affine transformation mapping of an initial image to a second image. In a first method, separate maps are generated and provided for carrying color information; the IFS codes representing these color maps are assigned a high probability so that points within this mapped region of the collage overlay tend to recur at a frequency proportional to the probability assigned to the color map. In a second method, an additional spatial dimension is employed for each map of a collage to represent the color information.

In the method employing the color maps, the hit count circuit 55 is rendered operative. This circuit includes two primary components, a hit count random access memory (RAM) 61, and a hit counter circuit 62. The hit count RAM is a 256×256×8 bit memory, and thus stores an 8-bit number for each pixel location. The hit count RAM 61 is provided an address on lines 63 denominated SEQUENCED ADDRESS from an address sequencer circuit 70. Additionally, the hit count RAM is provided with address information on lines 53 from the pixel address register 51.

Two separate addressing modes are provided for the hit count RAM 61. In a first mode, address signals on lines 53 from the pixel address registers 51 successively address the memory locations to load the memory with the results of a transformation; this is the iterative operation of decoding. In a second mode, the RAM 61 locations are successively addressed via the SEQUENCED ADDRESS lines 63 to retrieve the data stored therein, which represents the decoded color information for a given pixel; this is the result and output of the decode operation. The latter data is read out and provided as the PIXEL DATA on lines 64a to the video processor 22.

During iterative decoding, at the time a pixel address occurs from the digital matrix processor 30, indicating that a point in the 256×256 display space is generating a point, the fact of the point causes the value stored in the hit count RAM 61 to increment. The hit counter 62 is a digital circuit which is operative to increment the contents of the addressed location in the hit count RAM 61.

After the system has completed its iterations and the attractor has emerged (assuming that we are still discussing the color map color encoding method), the values in the hit count RAM 61, divided by the number of iterations, will be numbers proportional to the probability of occurrence of a point in the color map. Each of these numbers corresponds to a predetermined color for display at that pixel location; the numbers are recalled from memory and provided over the PIXEL DATA lines 64a to a video switcher circuit 65 when the video frame is downloaded to the video processing board 22. The appropriate color value associated with the number being provided on the PIXEL DATA lines is retrieved from a separate look-up table (not shown) located in the video processing board and causes that particular color to be displayed at the appropriated pixel location.

The second method for decoding color information is where the color data is encoded as an additional spatial dimension. The pixel RAM 56 is provided for this purpose. The pixel address register 51 provides an address on lines 53 to the pixel RAM 56 for picking a particular address corresponding to the 256×256 array. In this case, Zoran data line 31 provides sequences of three meaningful numbers x, y, and z. The numbers x and y are the values corresponding to the address of a pixel in the 256×256 array, as before, but in addition, a z-value corresponding to the color information to be displayed at that point is stored in the pixel address register 51 and then sent to the pixel RAM 56. The SEQUENCED ADDRESS on lines 63 then addresses the pixel RAM 56 in succession as the values in the pixel RAM 56 are read out as pixel data on lines 64b.

Both PIXEL DATA lines 64a, 64b are provided to a video switcher 65, which selects between the PIXEL DATA on lines 64a from the hit count circuit 55 and the PIXEL DATA on lines 64b from the pixel RAM 56. The output of the video switcher 65 is the VIDEO DATA which is included among the output lines 21 to the video processor 22.

The VIDEO SYNC signal is also included among the lines 21 and is provided to an event counter circuit 47, which counts the number of video lines and the pixel number on a given line. This circuit keeps track of where a frame of video data begins and ends, so that the a frame may be read out from the pixel RAM 56 in proper order. The signal COUNT DONE from the event counter 47 provided to the microprogram controller 44 signifies that the end of a video line or of a frame has been reached. The microprogram controller 44 is responsive to provide the START COUNT signal back to the event counters 47 to reset them appropriately at the beginning of a frame or the beginning of a line.

An address sequencer circuit 70 is provided for sequentially addressing the hit count RAM 61 or the pixel RAM 56, depending upon the color encoding method employed, to cause these memories to provide their contents in sequence as each pixel location is addressed for generation of an image. The PIXEL DATA on lines 64a, 64b is therefore sequentially provided in a raster-scan manner as the VIDEO DATA signal on lines 21, which is provided to the video processing board and screen buffer 22 which is then displayed.

It will be recalled further that there are two iteration methods carried out in the preferred embodiment for decoding a given set of IFS codes to provide an image output. These IFS codes in both methods are stored in a coefficient RAM 72, which in the preferred embodiment is eight bits per coefficient by twelve possible coefficients per affine transformation, for a total of 96 bits per transformation. The Zoran digital matrix processor in the preferred embodiment requires 16 data coefficients, each of length 8 bits, to be entered in the circuit although, in the present application, four of them are always set to zero. Nonetheless, all 16 coefficients must be supplied for each affine transformation for a total of 128 bits per transformation. A 64K bit memory provides room for 500 such transformations. However, in the preferred embodiment, fewer than 100 transformations are usually sufficient to represent an entire 256 by 256 image.

The coefficient RAM 72 is provided with data representing the IFS codes or coefficients over the IFS interface board data bus 42, as the COEFFCIENTS signal on one of the data lines 31. The RAM 72 is provided addresses from two sources: one source is the signal denominated SEQUENCED ADDRESS on lines 73, and the other is the signal denominated COEFFICIENT ADDRESS on lines 74. The SEQUENCED ADDRESS is generated by the address sequencer 70 in sequence when iterations of an image are being performed. During the deterministic or set decoding method, it will be recalled that each transform is applied to all points in a given initial image to produce a second image which then replaces the initial image. This process is repeated until the attractor emerges at a sufficient resolution. Thus, when decoding in pictures encoded in this manner, addresses for the coefficient RAM will be provided in a predetermined numerical sequence to step through the memory.

The COEFFICIENT ADDRESSES on lines 74 is used to address the coefficient RAM 72 when the random iteration method is employed for decoding images. These address signals are provided from a probability RAM 75, which stores numbers corresponding to the probabilities which have been assigned to each of the maps or sets of affine transformation coefficients. It will be recalled from the discussion above that in the random iteration method, each of the maps representing an affine transformation is assigned a probability, which probability generally relates to the weight to be afforded a particular transformation. The probability RAM 75, which is 8K in the preferred embodiment, stores numbers which represent the transformations which may be selected. The probability RAM is provided with numbers representing the probabilities of the maps via the IFS interface board data bus 42, and addresses for loading data by the SEQUENCED ADDRESS lines 73. When the probability RAM is addressed, the controller 12 loads the probability RAM with the probabilities assigned to each of the coefficients stored in the coefficient RAM 72.

In decoding an image in the random iteration method, the affine transformation coefficients are selected at random, weighted by the probabilities stored in the probability RAM. Thus, there is also provided a random number generator 78 which generates a random address into the probability RAM 75 denominated PROBABILITY ADDRESS on lines 79. The random number generator 78 is a conventional pseudorandom digital number generator constructed in the known manner to have period $2^{32}$. The PROBABILITY ADDRESS is thus used to address the probability RAM 75 in a random sequence (as contrasted with the SEQUENCED ADDRESS on lines 73 for loading). When one of the transformations is to be selected for application to the display image, the randomly-varying probability address on line 79 selects an address in the probability RAM 75.

The contents of the probability RAM 75 are addresses into the coefficient RAM 72; these addresses are loaded into the probability RAM 75 in proportion to the probability of occurrence of the particular affine transformations. In other words, the address of a coefficient having the greatest likelihood of selection is stored at the greatest number of locations in the probability RAM 75. The address of a coefficient of a transformation having a low likelihood of selection is stored at perhaps only one location. Thus, a high probability transformation has a higher likelihood of being selected when a random probability address occurs on the lines 79, since there are more locations having the more frequently accessed address.

PREFERRED IFS ENCODING METHODOLOGIES

Two different methods for encoding input images are disclosed herein. One method is a manual method, which involves the intervention of an operator. This method has the advantage that an operator can in some instances more rapidly effectuate the encoding of an image because the operator can recognize patterns in an input image which are efficiently represented with IFS codes. Referring again to the example of a scene with clouds, mountains, and forest, an operator will readily recognize that the each of these regions are conveniently dealt with as a unit, and may be efficiently IFS-encoded.

A second method involves automated encoding. This method has the advantage that no human operator is involved, but at present has the disadvantage that it is computationally expensive. The Hausdorff distance is employed to iteratively compute and minimize the error between the attractor produced by the decoder 20 and the input image.

MANUAL METHOD FOR ENCODING IMAGES

FIGS. 12 and 13 illustrate the method employed in the preferred embodiment for encoding a given input image, to determine a set of IFS codes which represent the input image. These IFS codes can then be processed by a system having only the decoder 20, video processing circuit 22, and color monitor 15. Assume that a system constructed in accordance with FIG. 9 is employed, programmed as described above.

Figure 13A:
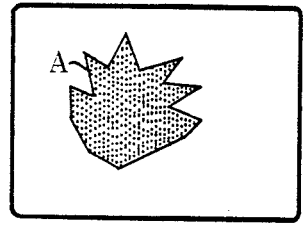

A given input image is designated as A, for example as leaf as shown in FIG. 13A, and is input to the system as shown at step 100 in FIG. 12. This image A, which can be a bit-mapped image or a polygonal or other geometric representation, is first displayed on the monitor 15, so that an operator can view the image. Assume further that the input image A has certain objects or segments having characteristics in common which can be isolated and dealt with separately, for example, in a scene which includes mountains, forest, and clouds (see for example FIG. 21), the mountains in region or segment $S_m$ can be isolated and "distorted copies" or affine transformations made of the mountains alone. The other segments of the forest $S_f$ and of the clouds $S_c$ are similarly treated as a unit. For a specific example, in FIG. 13B the leaf A can be isolated and a contractive copy $A_1$ generated by the system and displayed.

The generation of a contractive copy can be conveniently specified by picking three points of the original image and indicating where these three points will be moved in the transformation creating the contractive copy. This indication is sufficient to specify an affine transformation such as W of Equation 1, since six equations and six unknowns result from the indication:

$$x'_1 = ax_1 + by_1 + e$$

$$y'_1 = cx_1 + dy_1 + f$$

$$x'_2 = ax_2 + by_2 + e$$

$$y'_2 = cx_2 + dy_2 + f$$

$$x'_3 = ax_3 + by_2 + e$$

$$y'_3 = cx_3 + dy_3 + f.$$

By standard techniques known to those skilled in the art, these six equations can be solved for the six parameters (a,b,c,d,e, and f) specifying a two-dimensional affine transformation. The preferred embodiment also carries out and provides other methods of generating affine transformations: rotation about a point, and stretching or compression in a specified direction. The implementation of these additional methods proceeds via standard matrix algebra techniques which are implemented in a computer program, as will be known to those skilled in the art.

Figure 13F:
Figure 13B:
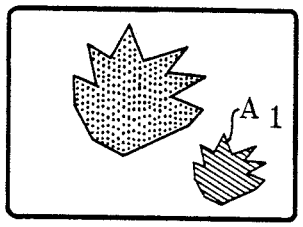
Figure 13G:
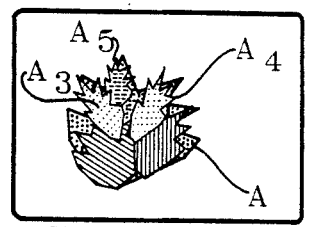
Figure 13C:
Figure 13H:
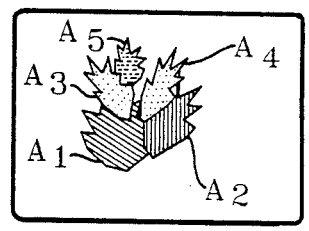
Figure 13D:
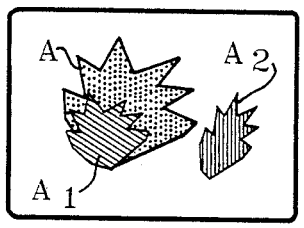
Figure 13I:
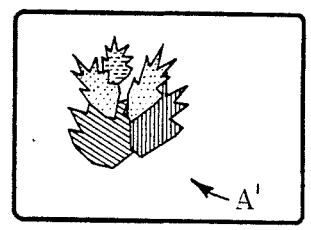
Figure 13E:
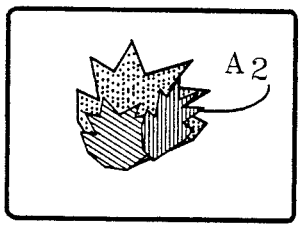

The next step taken in FIG. 12 is to tile A with contractive, affinely transformed copies of A, designated $w_i(A)$, so that A is contained within the union of the affine copies. This step is shown at 105. Referring in this regard to FIG. 13C, it will be seen that the copy $A_1$ is tiled with respect to A. In FIG. 13D, an additional copy, which is designated $A_2$, is formed and displayed by the system, and tiled with respect to A as shown in FIG. 13E. FIG. 13F shows three more contractive affine copies $A_3$, $A_4$, and $A_5$, all of which are tiled with respect to A in FIG. 13G until A is completely covered. FIG. 13H shows the collection of contractive copies $A_1-A_5$, without the underlying original target image A, while FIG. 13I shows the target image A overlying the tiled copies.

It will be seen that the tiling process does not necessarily completely cover the target image A; FIG. 13I shows that some of the tiled copies extend outwardly of or overhang the target image, while in FIG. 13G it will be noticed that there are some areas of A which are not covered. These overhangs or gaps give rise to errors when the affine transformation coefficients representing the tiling process are decoded to recreate an image. Accordingly, at step 110, the IFS codes are modified to include a residual set R or $w_0(x)$ defined as:

$$w_0(x) = R = A \setminus \bigcup_{n=1}^{N} w_n(A) \quad \text{(EQUATION 9)}$$

Further explanation of the residual set R is in order. First, those skilled in the art will understand that the " $\setminus$ " operator is a set subtraction operator. In other words, the residual set (i.e., the residual of the image) is what remains after removing the collage of transformed copies, which are represented by the IFS codes. The residual set is included with the IFS codes as separate information. A simple example illustrates the point. Assume in FIG. 8B that two maps $W_1$ and $W_2$ are used to represent the tree, and that the remainder of the tree is the trunk (that is, the residual set $w_0$ is $W_3$, and $W_3$ is not an affine transformation like $W_1$ and $W_2$). Accordingly, on decoding, each time that the residual set $W_3$ is selected at random, a point from the residual set (representing the unencoded tree trunk) is selected and placed in the display memory. Thus, $W_3$ picks up the residual information in the image. In other words, the residual set represents information which is left over after the affine contractive transformations $W_1$ and $W_2$ have been applied to cover up most of the image.

Figure 13J:
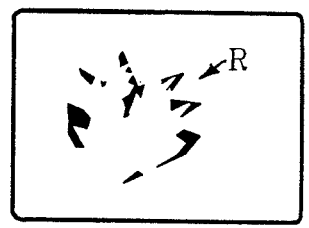

Referring now again to FIGS. 12 and 13, the dark areas of FIG. 13J illustrate the residual set R after removing the areas covered by the affine copies $A_1-A_5$ of FIG. 13H. This residual set is encoded and transmitted in one of two possible manners. Firstly, if the residual set possesses any characteristics which lend themselves to a subsequent IFS encoding, then the residual set R will be treated as a new input image, and the steps of encoding repeated to obtain a subsequent set of IFS codes. On the other hand, and secondly, if the residual set appears disjointed and unrelated, the residual set is preferably encoded with conventional methods such as run length encoding, Huffman encoding, etc., or is transmitted in unencoded form by a data file of (x,y,z) coordinates.

In the preferred method, a subsequent or second encoding process is carried out, using now only the residual set R as the input image. A second set of IFS codes is obtained, and transmitted with the first set. Because of the operation of the Collage Theorem, the union of the image produced by the IFS codes for the first portion of the image and the image produced by the IFS codes for the residual set, reproduces the entire image. It will be appreciated that the input image may contain several regions which have characteristics in common, for example, in the scene of clouds, forest, and mountains, the clouds will be treated as one region to obtain a first set of IFS codes, the forest as a second region to obtain a second set of IFS codes, the mountains as a third region to obtain a third set of IFS codes, and any residual portions of the image treated as a residual set to obtain either a fourth set of IFS codes or alternatively a fourth set of coordinates of points which are not IFS-encoded.

It will therefore be appreciated that step 110 may be repeatedly reached in the carrying out of the method. This means that a plurality of sets of IFS codes, the first representing a first portion of the image (usually one having particular characteristics in common, such as the mountain portion, or the forest portion, or the clouds portion, of an exemplary image having mountains, forest, sky, and clouds), and with subsequent codes representing other, residual portions of the image, are employed to represent and encode an entire image. At some point, the residual set may possibly be so disjointed and scattered that it is not practical or desirable to attempt to perform the collaging and find IFS codes for that portion of the image. This point usually occurs after most of the regions of the image which have characteristics in common have been collaged with contractive copies and IFS codes found. It is then preferable to transmit the resultant data for the residual, un-IFS encoded portions of the image using conventional compression techniques such as Huffman coding, run length coding, or the like. Of course, it will be understood that no IFS compression is occurring for such residual portions.

It will be observed that the residual set R in FIG. 13J appears to be disjointed and unrelated. In such a case, the second method is preferably employed to represent the residual. The residual set will also be assigned a probability, and if decoded according to the random iteration method, when the residual set is selected by random selection, a point in the residual set will be plotted.

At step 115, the attractor for the IFS codes generated by the tiling process, as modified at step 110, is generated with the decoder 20. This attractor is then compared to the original target image to determine the error. If the error is significant, additional tilings are performed, by returning to step 105. For most real world images, a plurality of iterations is required to completely encode the image. The error may be subjectively determined, by an operator who makes a subjective judgment as to when the attractor sufficiently resembles the input image, or the error may be quantitatively determined by calculating the Hausdorff distance between the attractor and the input image for each encoding pass, until the distance is minimized or the rate of reduction of the Hausdorff distance is so small that it is not viable (in terms of economics, time, compression resources, etc.) to seek further IFS compression.

When the attractor generated is sufficiently close to the target image, as shown at step 120, R should preferably be zero. However, as described above, R in some instances will actually reach zero. If R is not zero or acceptably close to zero, then there are additional portions of the original image for which the affine transformation and tiling process is needed. For example, in a scene with trees, mountains, and clouds, each of these regions having characteristics in common are handled separately, and the first pass through step 105 may have only dealt with the cloud regions. The program flow then returns the operator to step 100, and an additional region of the target image is isolated, for example the trees, and affine contractive copies are made and tiled in accordance with step 105.

When the residual set R is zero (or sufficiently close to zero), the compression process is complete, and the IFS codes, plus any data representing the residual un-IFS encoded portions of the image, now represent the original target image and can be decoded by a decoder 20 located remotely from the encoding system. The IFS codes are thus transmitted or stored in accordance with known methods.

Certain prior art skeptics have not believed that the present invention will operate because theoretically, unless real numbers with infinite precision are used to represent the image (which of course is impossible in a real world computer), it is not possible to have a truly contractive affine transformation for a given image. However, in the present invention it should be understood that an affine contractive map does not necessarily have to appear contractive on the display screen 15. Rather, the mapping must be affine and contractive mathematically. It has been discovered that the contractivity condition need only be approximately satisfied with respect to the resolution of the display space.

Referring in this regard to FIG. 18A, it will be seen that there are two points $P_1$ and $P_2$ prior to a contractive affine transformation. These points represent the mathematical coordinates of two points within an image; the squares separated by grid lines represent the actual pixels displayed on the display screen. The distance between these two points is denoted $D_{before\ transform}$. The presence of a mathematical point within a square causes the illumination of the associated pixels $PIX_1$ and $PIX_2$.

Because of the difference between the precision of the numbers representing the mathematical coordinates of the points and the resolution of the display screen, it is possible for the points to be mathematically closer to each other, and therefore properly contractive, yet appear to be farther apart on the display screen. Assume that a rotational type affine transform moves the two points $P_1$ and $P_2$ to the new locations $P_1'$ and $P_2'$ as in FIG. 18B. Note that the distance between the points $P_1'$ and $P_2'$, denoted $D_{after\ transform}$, is less than the distance $D_{before\ transform}$, so the transformation is properly contractive. However, because $P_2'$ has moved to an adjacent grind square because of the rotation in space, the pixels $PIX_1$ and $PIX_3$ are now illuminated. So, the transform on the display screen may have the appearance that the mapping is not contractive, since the image may appear to have expanded. In actuality, the transformation is mathematically contractive, and therefore the method still works.

AUTOMATED METHOD FOR ENCODING IMAGES

As in the manual method described above, regions of the image having similar characteristics are identified. As will be known to those skilled in the art, standard segmentation methods exist, which are based on edge detection, texture classification and color analysis, which can segregate a wide variety of image segments or regions. Such regions as may be segmented are identified and separately IFS encoded. The image is then represented by the total number of IFS codes generated, plus whatever residual sets may then accompany the IFS codes. These residual sets can then in turn be encoded by further IFS codes or else compressed by standard compression methods.

The best mode presently known to the inventors for automatically encoding a given input image is to employ the Hausdorff distance computation of Equation 8 above. A given input image is provided to the encoding system 10. An arbitrary starting affine transform is chosen, and applied to some region of the picture, for example, in many pictures there will be either regions having color similarities or geometric similarities which can be isolated and treated separately. As a specific example, in the exemplary scene of forest, mountains, and clouds, the forest will likely be range of green hues, and can be located by an examination of the color values of the pixels.

The affine transformations are applied to the starting region, and a set of IFS codes generated. This set of IFS codes is sent through the decoder 20 to obtain an output image. The comparator 24, which is preferably a minicomputer or a mainframe, computes the Hausdorff distance, and provides an error value to the controller 12. Additional affine transformations are made, and the system iteratively attempts to reduce the Hausdorff distance. When the gains from reduction of the Hausdorff distance approach a predetermined limit, for example when the decrease in Hausdorff distance compared to the previous iteration is less than, say, one percent and the total Hausdorff distance is, say, less than 1/256, the process stops, and the picture has now been automatically encoded.

Of course, it will be understood that Hausdorff distance computations are computationally expensive, and it is expected that additional improvements to the present invention may occur if methods can be found to reduce the computational complexity of this measure, while still remaining within the scope of the present invention.

PIXEL VISITATION FREQUENCY METHOD FOR REPRESENTING COLOR INFORMATION

In order to encode or represent color information in a given input image, we will now introduce the concept of providing a measure for each pixel location, which measure forms the index into a color table. The color table contains the appropriate color code which is to be displayed at the particular pixel location. This measure, for purposes of the following discussion, is represented by $\mu$. The attractor for the IFS is denoted by $\alpha$, a subset of $R^2$. The measure may, in one analogy, be thought of as a distribution of infinitely fine sand, of total mass one, lying upon $\alpha$. The measure of a subset B of $\alpha$ is the weight of sand which lies upon B. It is denoted by $\mu(B)$. Precisely, however, $\mu(B)$ is defined as the Borel measure of B considered as a subset of $R^2$. The underlying model associated with an IFS code consists of the attractor $\alpha$ together with the measure $\mu$, and is symbolized by $(\alpha, \mu)$.

The structure of $\alpha$ is controlled by the affine maps $\{W_1, W_2, \ldots, W_N\}$ in the IFS code. That is, the 6*N numbers in the affine maps fix the geometry of the underlying model and will in turn determine the geometry of associated images. The measure $\mu$ is governed by the probabilities $\{p1, p2, \ldots, pN\}$ in the IFS code. It is this measure which provides the rendering information for images.

The underlying model $(\alpha, \mu)$ may be thought of as a subset of two-dimensional space whose geometry and coloration (fixed by the measure) are defined at the finest imaginable resolution. The way in which the underlying model defines images, via projection through viewing windows onto pixels, is described next.

Let $(\alpha, \mu)$ be the underlying model associated with an IFS code. Let a viewing window be defined by:

$$V = \{(X, Y): a \leq X \leq b, c \leq Y \leq d\}. \quad \text{(EQUATION 10)}$$

It is assumed that V has positive measure, namely, $\mu(V) > 0$. Let a viewing resolution be specified by partitioning V into a grid of L×M rectangles as follows. The interval [a,b] is divided into L subintervals $[X_{l-1}, X_l]$ for $l = 1, 2, \ldots, L$, where $$X_l = a + (b-a)*l/L. \quad \text{(EQUATION 11)}$$

Similarly, [c,d] is divided into M subintervals $[Y_{m-1}, Y_m]$ for $m = 1, 2, \ldots, M$ where $$Y_m = c + (d-c)*m/M. \quad \text{(EQUATION 12)}$$

Let $V_{l,m}$ denote the rectangle $$V_{l,m} = \{(X, Y): X_{l-1} \leq X < X_l \text{ and } Y_{m-1} \leq Y < Y_m\}. \quad \text{(EQUATION 13)}$$

Then the digitized model associated with V at resolution L×M is denoted by $\overline{I}(V, L, M)$. It consists of all of those rectangles $V_{l,m}$ such that $\mu(V_{l,m}) \neq 0$.

The digitized model $\overline{I}(V, L, M)$ is rendered by assigning a single color index to each of its rectangles $V_{l,m}$. To achieve this, one specifies a color map f which associates integer color indices with real numbers in [0,1]. Let num_cols be the number of different colors which are to be used. One might choose, for example, eight graytones or eight colors in a red-green-blue (RGB) additive color system; then num_cols = 8 and color index i is associated with 12.5*i% red, 12.5*i% green, and 12.5*i% blue, for $i = 0, 1, 2, \ldots, 7$. The interval [0,1] is broken up into subintervals by specifying constants $C_i$ according to:

$$0 \leq C_0 < C_1 < \ldots < C_{num\_cols} \leq 1. \quad \text{(EQUATION 14)}$$

The color map is defined by:

$$f(X) = \quad \text{(EQUATION 15)}$$

$$\begin{cases} i \text{ if } C_{i-1} \leq X < C_i, \text{ for } i = 1, 2, \ldots, num\_cols\text{-}1 \\ num\_cols \text{ if } C_{num\_cols-1} \leq X \leq C_{num\_cols} \end{cases}$$

$\overline{I}(V, L, M)$ is rendered by assigning color index $f(\mu(V_{l,m})/\mu(V))$ to the rectangle $V_{l,m}$.

In summary, the underlying model is converted to an image, corresponding to a viewing window V and resolution L×M, by digitizing at resolution L×M the part of the attractor $\alpha$ which lies within the viewing window. The rendering values for this digitization are determined by the relative measures $\mu(V_{l,m})/\mu(V)$, which correspond to the relative masses of sand which lie upon the pixels.

It will thus be appreciated that color information is encoded by the measure, and represented in a given set of IFS codes as a probability associated with an IFS code.

As an example of the foregoing description, consider the simplest image representation, in which each pixel is assigned only the value zero or the value one to represent, respectively, the absence or the presence of the image at the pixel's location (a pure black and white picture, with no gray tones). To reproduce the image, all locations with pixel value zero are made black and all remaining pixel locations with value one, are made white. In this case num_cols = 2, and the constants $C_i$ may be chosen as follows: $C_0 = 0$, $C_1 = 0.5$, and $C_2 = 1.0$.

More complex image renderings are possible if the pixel data assume a larger number of values, corresponding to various shades of gray in the image, from black to white. Furthermore, color may be represented by assigning a color to each pixel value. A more general method of representing color information is to provide a complete set of pixel data for each primary color in the image. From well-known color combination principles, three such sets, with each set corresponding, for example, to red, green, and blue, are sufficient to represent virtually all hues and shades of color.

It will now be appreciated that this preferred method for representing color information provides color rendering for a digitized model associated with the viewing window V at resolution L×M, and provides a single color index to each of the pixels. The digitized model is specified with a color map f which associates integer color indices with real numbers.

The following algorithm, which is implemented as a C language computer program in the disclosed embodiment, starts from an IFS code $\{W_n, p_n: n = 1, 2, \ldots N\}$ together with a specified viewing window V and resolution L×M, it being understood that in the disclosed embodiment L = M = 256. It computes the associated IFS image. In effect, a random walk in the space $R^n$ is generated from the IFS code, and the measures $\mu(V_{l,m})$ of the pixels are obtained from the relative frequencies with which the different rectangles or pixels $V_{l,m}$ are visited.

An initial point $(X_0, Y_0)$ needs to be fixed. For simplicity assume that the affine transformation $W_1(X) = AX + b$ is a contraction. Then $(X_0, Y_0)$ is obtained by solving the linear equation:

$$\begin{pmatrix} X_0 \\ Y_0 \end{pmatrix} - A \begin{pmatrix} X_0 \\ Y_0 \end{pmatrix} = \begin{pmatrix} b_1 \\ b_2 \end{pmatrix} \quad \text{(EQUATION 16)}$$

An L×M array I of integers is associated with the digitized window. A total number of iterations, num_its, large compared to L×M also needs to be specified, and in practice is selected to be the number of iterations required for the image to stabilize. The random walk part of the algorithm now proceeds as follows. The L×M array I is initialized to zero. The following is the C language pseudocode program embodying the method:

```
for(n = 0; n < num_its; n++)
{
```

```
-continued
rand = a random number in [0,1];
total = p_1; k = 1;
while(total < rand)
{
k = k + 1;
total = total + p_k
}
```

$$\begin{pmatrix} X_{a+1} \\ Y_{a+1} \end{pmatrix} = W_k \begin{pmatrix} X_n \\ Y_n \end{pmatrix};$$

```
for(l = 1, l < L + 1, l++)
{
    for(m = 1, m < M + 1, m++)
    {
        if(X_{l-1} ≤ X_{a+1} < X_l and Y_{m-1} ≤ Y_{a+1} < Y_m)
            then I[l][m] = I[l][m] + 1;
    }
}
```

After execution of the above program, the hit count array element I[l] [m] contains the number of times that pixel $V_{l,m}$ has been visited in generating the image.

Finally, the elements of the array I are given color index values according to the following expression, which is also implemented as a C language program in the disclosed embodiment:

$$J = \sum_{l=1}^{L} \sum_{m=1}^{M} I[l][m];$$

```
for(l = 1, l < L + 1, l++)
{
    for(m = 1, m < M + 1, m++){
        I_{l,m} = f(I[l][m]/J);
    }
}
```

In the above program, it will be understood that J corresponds to the total "measure", in that the determination of the relative weightings does not occur until after the image has stabilized, and the pixels have been visited a number of times corresponding to the probability assigned to the various transformation maps.

Providing that num_its is sufficiently large, the ergodicity of the method ensures that, with very high probability, the rendering value or color index $I_{l,m}$ assigned to the pixel $V_{l,m}$ stabilizes to the unique value defined by Equation 15. In the preferred embodiment, a separate table is provided for carrying the appropriate color data; indexing into this table as described above then causes the recall of the appropriate color information, which is then provided as an output for the corresponding pixel. Thus, when that pixel is displayed, it will be rendered at the proper color.

Generating gray-tone in this manner enables use of the preferred embodiment in a very intuitive way to encode the color or gray-tone of an image. In the tiling process (see FIG. 13 and accompanying description), each "tile" (representing a particular affine transformation) is shaped and placed so as to cover a particular color or gray area of the original target image. The probability of selecting this affine transformation is then chosen so as to generate a quantity of hits within the tile area corresponding to the desired color or gray-tone.

While this process seems straightforward, it can be appreciated that the placement of the initial set of tiles in the encoding process is directed by necessity to the appropriate encoding of the shape of the target image. Once a shape is acceptably encoded, however, additional tiles can be overlaid on the target image to increase the hit count of the overlaid region. In other words, some of the contractive affine copies are collaged for representing shape, while others are collaged for representing color. By repetitively using this technique, many different color or gray tone regions may be represented in the compressed data.

The method of selection is controlled interactively by the operator in the preferred embodiment for each affine transformation and leads, as has been described, to the generation of varying hit counts across the given target time. In the preferred embodiment, these hit counts are transformed to color index $I_{l,m}$ by the color map f. The color map is selected by the user of the image compression system. During the development leading to the present invention, it was discovered that, for pleasing images, the color map cannot be an arbitrary assignment rule, but must in general be monotonically increasing in brightness for increasing hit count. FIG. 20 provides several examples of gray-scale assignment functions, but it can be appreciated that these examples by no means exhaust the depiction of acceptable assignment functions.

The selection of an appropriate color map f generally requires an iterative process. The color map interrelates with the selection and assignment of probabilities of the sets of transformations, but is not directly determined by these probabilities. In general, if a contractive copy covers a blue region, for example, and that contractive copy is associated with a relatively low probability of selection, then the color blue should be associated with an interval of relatively low hit counts. In the preferred embodiment, a user of the system can define n points of hit count intervals sized to create num_cols intervals of varying size. With these intervals, the user can associate each of the num_cols colors with a particular one of the hit count intervals. After the selection of the hit count intervals and the color association, the user can request a display or redisplay of the image from the hit count pixel data. By varying the size of the hit count intervals and the selection of colors to be associated with each of the intervals, and by defining additional contractive transformations to increase hit counts for particular regions, the user can iteratively work with the system until a satisfactory color depiction is achieved.

Referring in this regard to FIG. 19, assume that the input image viewing window V has a plurality of pixels $P_1, P_2, \ldots$, etc. Assume further that there are rendered regions such as region $R_1, R_2, \ldots$ etc., a total of eight regions, with each region comprising a plurality of pixels having similar rendering values (with region $R_1$ corresponding to the highest rendering value and region $R_8$ corresponding to the lowest rendering value, say, zero). It will of course be understood that the rendering values can be gray scale as well as color, but assume for purposes of the example that there are but eight different rendering values, and that there is some association, which may be completely arbitray, between the rendering value and the color of the region.

The method of encoding the rendering values thus entails first determining the number of different rendering values in the image to be encoded, which is eight in the pesent example of FIG. 19. Next, a "measure" is determined corresponding to the cumulation of the rendering values for all pixels in the image. This merely involves adding all the rendering values to reach a cumulative total. Then, a weighting is assigned to each one of the number of different rendering values. Assume for purposes of the example, and by way of example only and not limitation, that the weighting is as shown in FIG. 19, where the color values for the region $R_1$ are assigned the heaviest weighting and the color values for the region $R_8$ are assigned the lowest weighting. It should be understood that this weighting is completely arbitrary.

A rendering mapping of each one of the rendering values to one of the different renderings to be encoded is then determined, as described above, by creating and tiling a contractive copies with respect to the region, for example, the region $R_1$ would be tiled with a contractive copy of, say, two pixels (in this simple example, since region $R_1$ is only three pixels in size, a contractive copy must have fewer pixels than this). Next, predetermined features of the image are encoded in the manner described herein with an iterated function system, to as to obtain a plurality of sets of transformation coefficients representing the image without color rendering.

Finally, a probability code is assigned to each one of the sets of transformation coefficients. This probability code varies in relation to the relative weight assigned to the number of different rendering values. For example, a high number will be assigned to region $R_1$, while a low number will be assigned to region $R_8$. This ensures that when the transformation coefficients are employed in decoding the image, those regions having higher probability codes will be visited more often than regions having lower probability codes.

The output comprises a set of compression codes comprising a plurality of sets of transformation coefficients, and a corresponding probability code for each one of the sets of transformation coefficients. Upon decoding, therefore, the display memory will contain hit counts for each pixel which are in proportion to the probability codes assigned in the encoding process, and these hit counts are used to index the color table to retrieve an appropriate color value to be displayed at the corresponding pixel location.

ADDITIONAL SPATIAL DIMENSION METHOD FOR REPRESENTING COLOR INFORMATION

The preferred embodiment also provides for a somewhat less intuitive, but more direct, method for representing gray-scale or color in an image. All of the pixel data and transformation coefficients are three-dimensional in nature, i.e., affine transformations and vectors are represented by the following equation rather than Equation 1. This means that a gray-scale or color index may be directed encoded into a z value.

$$\begin{bmatrix} x' \\ y' \\ z' \end{bmatrix} = w \begin{bmatrix} x \\ y \\ z \end{bmatrix} = \begin{bmatrix} a & b & t \\ c & d & u \\ q & r & s \end{bmatrix} \begin{bmatrix} x \\ y \\ z \end{bmatrix} + \begin{bmatrix} e \\ f \\ g \end{bmatrix} \quad \text{(EQUATION 17)}$$

In contradistinction from the hit count method described in the previous section, the additional dimension method requires that the overlap of the various affine transformations be minimized. This requirement can be achieved by tiling the original target figure with contractive affine copies so that no portion of the tiles lie on top of one another. The reason for this requirement can be appreciated from visualization of the original target image as a gray-tone surface, having a single z value for a given (x, y) pair. If two transformations overlap, then two (and possibly distinct) z values are generated for each (x, y) in the overlap region, rendering ambiguous the assignment of gray-scale or color value. The preferred embodiment resolves this ambiguity by taking the most recently generated z value. However, other satisfactory choices also may easily be implemented, for example averaging all z values generated. It should be noted, however, that for exact tilings, such as covering a rectangle by small non-overlapping rectangles, no ambiguity occurs. While this method provides for unambiguous gray-tone rendering, the result may not always be pleasing. It is therefore generally preferable to minimize overlaps between affine transformations.

The functionality requirement of the gray-tone surface places restrictions on the type of three-dimensional transformations which may be employed for pleasing results: the gray or color surface of the original target image may be moved up and down or stretched, but it cannot be made to fold on itself.

While the color surface must be functional in x and y, it must permit abrupt changes in gray-tone or color. Such changes occur in real images, as for example at the edge of structural components within an image, such as color boundaries between different objects in a given image. This means that a color surface would not necessarily be continuous, even if z were to assume real, rather than integer values. For the discrete values which z can assume, the presence of structural edges generally implies large changes in z between adjacent pixel locations.

The added dimension method has been enabled in the preferred embodiment of the present invention by providing image generation and storage for $2^{16}$ pixels, which corresponds to a grid of picture elements with 256 horizontal positions and 256 vertical positions. The horizontal positions x range from $-128$ to $+127$ and the vertical positions y range from $-128$ to $+127$. The color or gray-tone index z ranges from 0 to 255. Each point of an image is completely described by a triple of numbers (x, y, z). The affine transformations are three-dimensional in nature, according to Equation 17, and are specified by twelve (12) numbers, rather than six (6) numbers as is the case for two-dimensional transformations.

Because the affine transformations are specified by twelve numbers, rather than six, the added numbers (q, r, s, t, u, and g of Equation 17) must be specified during the encoding process. To encode an image, tiles composed of contractive copies of the original target image are overlaid on the original target image. In the preferred embodiment, a series of six (6) knobs controlling six (6) potentiometers are provided for specifying the additional six (6) elements of the affine transformation. These knobs are referred to as the q knob, the r knob, etc., and correspond to the element or parameter of the affine transformation being controlled. It can be understood from an examination of Equation 17 that a positive q value will in general increase the brightness of the contractive copy with increasing x value, and a positive r value will increase the brightness with increasing y value. Negative values for these parameters have the reverse effect. A positive s value has the effect of reinforcing the brightness of an original image, whereas a negative s value reverses the polarity of the brightness, i.e., makes a positive image into a negative image. The parameter g provides a constant offset so as to insure that the final z values are in the range 0 to 255. The t and u parameters distort the geometry of each tile according to the color information and have no effect on the color information of the transformed image. By simultaneously adjusting several knobs, predictable and interesting effects can be produced. For example, by adjusting g and q knobs simultaneously, it is possible to increase the brightness to the right of a specific x value and to decrease the brightness to the left of that x value, or vice-versa, depending on the signs of q and g.

With the color information specified entirely by the third or z dimension, the probabilities $p_i$ do not affect the color or gray-scale of the rendered image. These probabilities may therefore be selected to meet other requirements of the system. It turns out that the relative probabilities of selecting the various affine transformations affect the time of convergence of the rendered image, i.e., the time required for the final attractor image to stabilize. In order to have the fastest speed of convergence, the relative probability $p_i$ should be proportional to the determinant of the matrix part of the transformation $W_i$. This method is enabled in the preferred embodiment by the following C language pseudocode:

```
{
P = Σ(i=1 to n) det W_i;
for(n=1,n < N + 1,n++);
    { p_i = det W_i / P };
}
```

PARALLEL PROCESSING METHODS AND APPARATUS

Certain of the above methods for performing image compression lend themselves handily to parallel processing. As will be understood by those skilled in the art, additional increases in speed of encoding, transmitting, and storing can be gained to the extent to which image compression can be split up into tasks which can be performed simultaneously. Accordingly, it will be appreciated that the IFS methodology disclosed herein possesses certain characteristics which can be divided out and allocated to different, similarly constructed parallel processors for implementation. In particular, two approaches for parallel processing are considered part of the present invention—parallel random iteration image processing, and parallel set or deterministic image processing. Each of these will be described in turn.

PARALLEL RANDOM ITERATION PROCESSING

The speed of decoding an image from IFS codes can be increased by using multiple decoding components. Since the speed of image processing is normally determined by the speed at which affine transformations are made, the most significant improvement in speed is achieved by the use of multiple affine transformation processors connected in parallel. This section will discuss the use of multiple affine processors in random iteration processing, as outlined in FIG. 14. The next section will deal with use of multiple affine processors in set iteration processing. Reference is also made to FIG. 15, which is a pseudocode program listing for operation of the parallel processor embodiment, in connection with the following discussion.

FIG. 14 shows a random iteration processor 200 with M affine processors connected in parallel. A convenient, cost effective choice for M is 100. In practice, the number of parallel affine processors should be chosen so that the video processing board 22, which receives the output from the parallel processor 200, is driven at the maximum rate at which it can accept input (to maintain video data frame rates).

Before an image can be generated from input IFS codes, certain information must be input to the random iteration processor. A set of coefficients defining N affine transformations $W_1, W_2 \ldots W_N$ must be stored in the coefficient RAM 230. These coefficients may be supplied sequentially to the coefficient RAM 230 via the input lines 201. In addition, the probabilities $P_1, P_2 \ldots P_N$ are supplied via input lines 202 to the probability RAM 220. These coefficients and probabilities are the same as discussed above in connection with the decoder 20. These probabilities are associated with the frequency of selecting each affine transformation $W_i$, and may be provided by the user of the system. A default value for each $P_i$ may conveniently be chosen as $1/N$. Finally, a set of initial points $X_0$ within the space K, one for each affine processor, is provided. This is indicated in FIG. 14 by input lines 205a, 205b, ... 205m, supplying $_1X_0, _2X_0, \ldots$ and $_MX_0$, respectively, through multiplexer circuits 255a, 255b, ..., 255m, respectively, to affine processors (AP) 250a, 250b, ... 250m, respectively. Multiplexer circuits 255 are conventional eight-bit digital multiplexers.

The affine transformation coefficients are stored in the coefficient RAM 230 for later retrieval by index i. The probability RAM 220 is loaded with indices 1, 2, ..., N, with each index appearing $P_i \times L$ times, where L is the number of locations for storing indices. To initialize the processor, the hit count RAM and the pixel RAM 290 are cleared, the iteration index J is set to zero, and a completion timer is stopped and reset. The iteration index and completion timer are maintained by a controlled 12 associated with the parallel decoder. The largest contractivity factor S for the given input IFS codes is determined, and used to calculate the number of iterations H required to ensure a transformed point lies within the attractor A, in accordance with Equation 6 above.

To obtain a point for the image, a random number r is generated by the random number generator 210 and passed via line 212 to the probability RAM 220. The random number r should preferably be an integer between 1 and L. The random number r is used as an index to retrieve an affine transformation selection index i from the rth position in the probability RAM 220. The transformation selection index i is passed by line 222 to the coefficient RAM 230 where it is used to extract the coefficients of the ith affine transformation. These coefficients are passed by line 232 to a demultiplexer 240, where the select line 241 selects the first of the affine processors 250a to enable the demultiplexer to pass the coefficients to that processor via output line 242a.

The first affine processor 250a transforms the initial point $_1X_0$ with the transformation $W_i$ to generate a transformed point $_1X_1$. The transformed point $_1X_1$ is passed to multiplexer 280 via output line 252a, and fed back to the processor's input terminal 251a via multiplexer 255a. The feedback loop is connected so as to insure that each time an affine processor is selected, it will transform the point previously transformed.

The iteration index J is checked to ascertain whether it is greater than the minimum number of iterations H required to ensure that the transformed point is within the attractor A. If so, the transformed point $_1X_{j+1}$ is transferred via the multiplexor 280 and output line 282 to the pixel RAM 290. Once an element of the pixel RAM has been written into, it is not cleared until it is desired to replace the image being generated with a different image. The read/write (R/W) control line 294 is thereafore used to write newly transformed points to memory and to read the status of the pixel elements for purposes of displaying the image by means of lines 21 to the video processing circuit 22.

During the period of time that the first transformed point $_1X_1$ is being obtained by the affine processor 250a, another random number is generated in order to select another set of affine transformation coefficients at random. These coefficients are passed to the second affine processor 250b. This processor can thus be obtaining another transformed data point $_2X_1$ from initial point $_2X_0$ while $_1X_1$ is being obtained by affine processor 250a. The same process will be repeated for each of the affine processors seriatim through the last affine processor 250m which obtains transformed point $_MX_1$ from initial point $_MX_0$ supplied by input line 205m. In this manner a set of transformed points $_1X_1, _2X_1, \ldots, _MX_1$ are made available to the multiplexer 280 and are written in turn into the corresponding pixel element in the pixel RAM 290. Each time a pixel RAM element is written, the hit count for that element is incremented by 1. When all the affine processors have been selected in turn, control returns to the first affine processor 250a and the entire process is repeated so that a new set of transform points $_1X_2, _2X_2, \ldots, _MX_2$ is generated and passed to the multiplexer 280 for the pixel RAM 290. The entire process is continued for as long as it is necessary to obtain all of the points of a complete image.

It will thus be appreciated that the parallel affine processor 200 can be included as a portion of the IFS interface 40 in the decoder 20, to perform the functions of the hit count circuit 55, pixel RAM 56, random number generator 78, probability RAM 75, and coefficient RAM 72, all in the manner as described above, but at a much greater speed of decoding.

PARALLEL SET OR DETERMINISTIC IMAGE PROCESSING

FIG. 16 is a block diagram of the elements for accomplishing set iteration processing using affine processors in parallel. FIG. 17 is a pseudocode program listing of the steps which must be accomplished in set iteration taken by the preferred embodiment. It is convenient to provide as many affine processors $AP_1, AP_2, \ldots AP_N$ as there are affine transformations to encode a particular image. A convenient number to handle most image requirements is N=100. This number is arbitrary, but represents a number reasonably close to the actual number of affine transforms which have been found to occur for very complex images, in the range of fifty to eighty transforms. It is believed that about a single processor per transform will provide real-time decoding and display capability.

The set iteration processing technique requires an initial set of points defining an initial image $_1X_0, _2X_0 \ldots, _PX_0$. As described above, this can be an arbitrary starting image such as the square of FIG. 6. Moreover, different starting images can be provided for each separate processor; the contractivity condition ensures that the attractor will still stabilize, although it will be appreciated that the minimum number of iterations required will be related to the size of the largest object or region in a starting image.

These points are supplied by inputs line 301 and multiplexer 380 to the pixel RAM 390. This is the image which will be initially transformed in the first of the necessary number of iterations required to obtain a final image.

In addition, the IFS codes or coefficients to define each affine transformation must be supplied to each affine processor, one transformation per processor. In FIG. 16, for example, the coefficients for affine transformation $W_1$ is supplied via input lines 305a to affine processor 340a, affine transformation $W_2$ is supplied via input line 305b to affine processor 340b, and so on, with the last affine transformation $W_N$ being supplied via input line 305n to the last affine processor 340n.

To initialize the processor, the hit count RAM is cleared and the iteration index J is set equal to 0. The pixel RAM 390 is cleared and loaded with the initial set of points $_1X_0, _2X_0, \ldots, _PX_0$. The contractivity factor S for the given set of affine transformations is determined by the controller 12, and employed to calculate the number of iterations H required to ensure that the transformed set of points lies within the attractor A.

To obtain an image via the set iteration method, the image residing in the pixel RAM 390 is transferred to a temporary pixel RAM 320 and the pixel RAM 390 is cleared. Next, a loop is initiated by a scan loop generator 310 to scan the temporary pixel RAM for points in the set. Whenever a point is found in the set, it is provided via output line 325 to each of the affine processors 340a, 340b, ... 340n. The processors can then perform a transformation in parallel to generate N output points. Each of these output points is selected in turn by multiplexor 380 for storage via output line 382 in the pixel RAM 390. When all of the transformed points resulting from a single point in the temporary pixel RAM 320 have been stored in the pixel RAM 390, another point is located in the temporary pixel RAM 320 and the process is repeated. Thus, for a given iteration index J, a set of points $^1_1X_{j+1} \ldots ^1_PX_{j+1}$ is generated by affine processor 340a.

Similarly, a second set of points $^2_1X_{j+1} \ldots ^2_PX_{j+1}$ is generated by the second affine processor 340b. The same is true for each affine processor down through and including the last affine processor 340n. The totality of points thus generated are stored in the pixel RAM 390, where this totality of points comprises the set of points for the image corresponding to the Jth iteration. If J is less than H, then the image in the pixel RAM 390 is transferred to the temporary pixel RAM 320, the pixel RAM 390 is cleared and the entire process repeated to obtain an image for the next iteration. Finally, when J is greater than or equal to H, the set iteration process is complete and a final image is available in the pixel RAM 390 for providing via lines 21 to the video processing circuit 22.

It will be appreciated by those skilled in the art that rather than transfer the contents of the pixel RAM 390 to the temporary pixel RAM 320 at each stage of generating a new set of transformed points, the role of the pixel RAM 390 and the temporary pixel RAM 320 can be interchanged at each cycle. However, for clarity of presentation, FIG. 16 shows the image resulting from one particular cycle of iteration J being fed back to the temporary pixel RAM 320 for use as an input set of points for the next iteration. The feedback transfer can be obviated simply by sufficient connections and control lines to interchange the role of pixel RAM 390 and temporary pixel RAM 320 on alternate cycles of iteration.

The preferred embodiments of the present invention have been disclosed by way of example, and it will be understood that other modifications or improvements may occur to those skilled in the art in light of the information contained herein without departing from the scope and the spirit of the appended claims.

What is claimed is:

1. A method for compressing images, comprising the steps of:
   providing an input image having at least two dimensions;
   storing the image in a memory;
   displaying the image stored in the memory on a display;
   selecting a geometric first region of the image displayed on the display with selecting means;
   generating and displaying a contractive copy of the first region in the memory;
   storing a set of transformation coefficients corresponding to the transformation creating the contractive copy;
   on the display, collaging the transformed contractive copy with respect to the first region to align geometric features of the transformed contractive copy with corresponding geometric features of the first region;
   repeating the steps of generating and displaying a contractive copy, storing the transformation coefficients, and collaging the transformed contractive copy until substantially all of the first region is covered by a collage of transformed contractive copies, thereby providing a set of a plurality of transformation coefficients; and
   providing as an output a set of iterated function system compression codes corresponding to the set of a plurality of transformation coefficients.

2. The method of claim 1, wherein the transformation coefficients are affine transformation coefficients.

3. The method of claim 1, wherein the step of collaging the transformed copy on the display includes the step of modifying the transformation coefficients corresponding to the coordinates of the location and dimensions of the transformed copy.

4. A random iteration method for decoding iterated function system compression codes to generate an image, comprising the steps of:
   receiving and storing a plurality of compression codes in a compression code memory;
   determining an initial point in a display memory;
   randomly selecting one of the compression codes in the compression code memory;
   performing an affine transformation on the initial point corresponding to the affine transformation represented by the selected compression code to move the initial point to a second point in the display memory;
   storing a picture element in the display memory at a memory location corresponding to the location of the second point;
   utilizing the second point from the preceding step as an initial point, repeating the steps of randomly selecting one of the compression codes, performing an affine transformation, and storing a picture element, until an output image converges to an attractor in the display memory; and
   displaying data corresponding to the stored picture elements in the display memory corresponding to the attractor as a decoded output image.

5. The method of claim 4, wherein the method includes the step of discarding the stored picture elements generated by a first predetermined number n of iterations so as to prevent display of points substantially distant from the attractor.

6. The method of claim 5, wherein n is at least 50.

7. A deterministic method for decoding iterated function system compression codes to generate an image on a graphics display terminal, comprising the steps of:
   receiving and storing a plurality of n sets of compression codes;
   providing an initial image in a display memory associated with the graphics display terminal;
   performing transformations on the initial image in the memory corresponding to each of the n sets of compression codes;
   combining the results of the transformations so as to obtain a second image in the memory;
   utilizing the second image as the initial image, repeatedly iterating by carrying out the above steps, for a plurality of iterations of the n sets of compression codes, until an attractor stabilizes;
   storing in the memory a plurality of picture elements corresponding to the attractor as a final image; and
   displaying on the graphics display terminal data corresponding to the stored picture elements of the final image corresponding to the attractor as a decoded output image.

8. The method of claim 7, wherein the step of combining the results of the transformations comprises taking a weighted average of the outcome of the individual transformations with respect to each of the plurality of picture elements.

9. The method of claim 7, wherein the step of storing picture elements comprises:
   storing a set of picture elements corresponding to the results of the transformation step in a buffer memory to obtain the second image; and
   replacing the contents of the display memory with the contents of the buffer memory after completion of the transformation step.

10. Apparatus for decoding iterated function system compression codes to generate an image by random iteration, comprising:
   a compression code memory for storing a plurality of compression codes;
   a display memory for storing an image being generated;
   means for determining an initial point in said display memory;
   means for randomly selecting one of said compression codes in said compression code memory;
   means for performing an affine transformation on said initial point corresponding to the affine transformation represented by said selected compression codes to move said initial point to a second point;
   means for storing a picture element in a display memory at a memory location in said display memory corresponding to the location of said second point;
   iteration means for repeatedly utilizing said second point as said initial point for subsequent operations of said compression code selecting means, said affine transformation means, and said picture element storing means, until an output image converges to an attractor in said display memory; and means for displaying data stored in said display memory corresponding to stored picture elements corresponding to said attractor as a decoded output image.

11. The apparatus of claim 10, further comprising means for discarding stored picture elements generated by a first predetermined number n of iterations so as to prevent display of points substantially distant from said attractor.

12. The apparatus of claim 11, wherein n is at least 50.

13. An apparatus for decoding iterated function system compression codes to generate an image by deterministic decoding, comprising:
   a compression code memory for storing a plurality of n sets of compression codes;
   a initial image display memory for storing an initial image;
   a generated image display memory for storing a generated image;
   means for providing an initial image in said initial image display memory;
   means for performing an affine transformation on said initial image in said initial image display memory corresponding to each of said sets of compression codes;
   means for combining the results of said affine transformations to produce a second image in said generated image display memory;
   means for transferring said second image from generated image display memory to initial image display memory;
   deterministic iteration means for causing said affine transformation means, said combining means, and said transferring means to repeatedly operate for a plurality of iterations of the n set of compression codes, until an attractor stabilizes;
   means for storing a plurality of picture elements corresponding to the attractor in said display memory; and
   means for displaying data corresponding to the stored picture elements stored in said display memory corresponding to said attractor as a decoded output image.

14. The apparatus of claim 13, wherein said combining means comprises means for taking a weighted average of the results of the transformations with respect to each of the plurality of picture elements, with averaging occurring independently at each pixel location.

15. The apparatus of claim 13, wherein said picture element storing means comprises:
   a buffer memory for storing an intermediate image;
   means for storing a set of picture elements corresponding to the results of said affine transformation means in said buffer memory to obtain the second image; and
   means for replacing the contents of said display memory with the contents of said buffer memory.

16. An apparatus for decoding a compressed image represented by a plurality of sets of compression codes, each one of said sets of compression codes having a contractivity factor S, where $0 \leq S < 1$, and each one of said sets of compression codes having a probability code associated therewith, comprising:
   a compression code memory for storing a plurality of sets of input compression codes;
   a probability memory for storing the probability codes associated with each one of said sets of compression codes;
   means for storing said input compression codes in said compression code memory in addressable locations having addresses corresponding to said probability codes;
   a display memory corresponding to a display space for storing an image;
   a random number generator for generating a probability addresses which randomly vary;
   compression code selecting means responsive to said probability addresses for selecting compression codes stored at addresses in said compression code memory at a frequency corresponding to said probability codes, such that a compression code having a higher probability code is more likely to be selected than a compression code having a lower probability code;
   matrix processing means responsive to compression codes provided by said compression code selecting means for performing an approximately contractive affine transformation on an initial point in said display space to determine a second point in said display space;
   means for storing image data in said display memory corresponding to said second point in said display space;
   control means for causing said compression code selecting means and said matrix processing means to iteratively plot a plurality of points in said display space until an attractor of said compression codes stabilizes;
   means for storing data in said display memory corresponding to points plotted in said display space by said control means; and
   means for displaying the contents of said display memory after a plurality of iterations.

17. The apparatus of claim 16, further comprising hit count means for providing color rendering of images stored in said display memory, comprising:
   a hit count memory for storing a hit count of the number of times that each point in said display space was plotted;
   hit counter means responsive to the plotting of a particular point in display space for incrementing the hit count corresponding to that particular point in said display memory;
   means for retrieving the hit count for each point in said display memory and providing a color index;
   a color index memory for storing color values corresponding to a plurality of said color indices;
   means for displaying the color value stored in said color index memory associated with the color index for a particular point when said particular point is displayed by said displaying means.

18. The apparatus of claim 16, further comprising means for assigning colors to a plurality of hit count intervals, comprising:
   means for selecting a plurality n+1 of hit count values so as to define n hit count intervals; and
   means for associating each of n colors with a particular one of said hit count intervals.

19. The apparatus of claim 16, wherein each of said sets of compression codes corresponds to a three-dimensional contractive affine transformation of portion of an original input image, two of the dimensions corresponding to spatial dimensions and a third dimension corresponding to a color dimension, wherein said display space is as three-dimensional display space, and further comprising added dimension means for providing color rendering of images stored in said display memory, comprising:

a pixel memory for storing color data corresponding to a color value for each point in a display space;

means responsive for storing said color data in said pixel memory in response to a three-dimensional affine transformation performed by said matrix processing means;

means for retrieving said color data from said pixel memory for each point in said display memory; and means for displaying said color data for a particular point when said particular point is displayed by said displaying means.

20. Apparatus for compressing an image represented by an array of pixels, comprising:

a target memory means for storing an uncompressed input target image;

means for generating, aligning, and overlaying a collage comprising a plurality of contractive affinely transformed copies of a portion of said target image with respect to said portion of said target image stored in said target memory means until particular geometric features of said portion of said target image are substantially covered by said collage;

output means for providing, as a compressed image output, a plurality of compression codes corresponding to the numerical coefficients of said plurality of contractive affinely transformed copies of said portion of said target image;

decoder means responsive to said compression codes for generating and storing an approximation image in said approximation memory means;

an approximation image memory means for storing said approximation image;

comparator means for comparing said target image stored in said target memory means to said approximation image stored in said approximation image memory means and for providing error data;

affine transformation correction means responsive to said error data for modifying said collage of contractive affinely transformed copies of said portion of said target image to minimize the number of said compression codes.

21. The apparatus of claim 20, wherein said decoder means comprise a deterministic decoder.

22. The apparatus of claim 21, wherein said deterministic decoder comprises:

a compression code memory for storing a plurality of n sets of compression codes;

a initial image display memory for storing an initial image;

a generated image display memory for storing a generated image;

means for providing an initial image in said initial image display memory;

means for performing an affine transformation on said initial image in said initial image display memory corresponding to each of said sets of compression codes;

means for combining the results of said affine transformations to produce a second image in said generated image display memory;

means for transferring said second image from generated image display memory to initial image display memory;

deterministic iteration means for causing said affine transformation means, said combining means, and said transferring means to repeatedly operate for a plurality of iterations of the n sets of compression codes, until an attractor stabilizes;

means for storing a plurality of picture elements corresponding to the attractor in said display memory; and means for displaying data corresponding to the stored picture elements stored in said display memory corresponding to said attractor as a decoded output image.

23. The apparatus of claim 22, wherein said combining means comprises means for taking a weighted average of the results of the transformations with respect to each of the plurality of picture elements, with averaging occurring independently at each pixel location.

24. The apparatus of claim 22, wherein said picture element storing means comprises:

a buffer memory for storing an intermediate image;

means for storing a set of picture elements corresponding to the results of said affine transformation means in said buffer memory to obtain the second image; and means for replacing the contents of said display memory with the contents of said buffer memory.

25. The apparatus of claim 20, wherein said decoder comprises a random iteration decoder.

26. The apparatus of claim 25, wherein said random iteration decoder comprises:

a compression code memory for storing a plurality of compression codes;

a display memory for storing an image being generated;

means for determining an initial point in said display memory;

means for randomly selecting one of said compression codes in said compression code memory;

means for performing an affine transformation on said initial point corresponding to the affine transformation represented by said selected compression codes to move said initial point to a second point;

means for storing a picture element in a display memory at a memory location in said display memory corresponding to the location of said second point;

iteration means for repeatedly utilizing said second point as said initial point for subsequent operations of said compression code selecting means, said affine transformation means, and said picture element storing means, until an output image converges to an attractor in said display memory; and means for displaying data stored in said display memory corresponding to stored picture elements corresponding to said attractor as a decoded output image.

27. The apparatus of claim 26, wherein further comprising means for discarding stored picture elements generated by a first predetermined number n of iterations so as to prevent display of points substantially distant from said attractor.

28. The apparatus of claim 27, wherein n is at least 50.

29. A method of compressing an image represented by an array of pixels, comprising:

storing an uncompressed input target image in a target memory;

generating contractive transformed copies of a portion of the target image;

aligning the contractive transformed copies with respect to the portions of said target image stored in the target memory until particular geometric features of the portions of the target image are substantially covered by a collage;

providing, as a compressed image output, a plurality of compression codes corresponding to the numerical coefficients of the plurality of contractive transformed copies of the portion of the target image;

decoding the compression codes to generate approximation image;

storing the approximation image in an approximation image memory;

comparing the target image stored in the target memory to the approximation image stored in the approximation image memory means and providing error data as a function of the error between the two images;

modifying the collage of contractive transformed copies of the portion of the target image in response to the error data to minimize the number of compression codes.

30. The method of claim 29, wherein the method is carried out on a programmed computer.

31. The method of claim 29, wherein the step of comparing the approximation image to the target image is performed by an operator viewing the two images on a display screen, and wherein the step of modifying the collage comprises the step generating and collaging additional transformed copies or the step of repositioning or reshaping previously-generated transformed copies with respect to the collage.

32. The method of claim 29, wherein the method is carried out separately for each of a plurality of portions of the target image, thereby generating a plurality of sets of compression codes, each of said sets of compression codes corresponding to the carrying out of the method for a single portion of the target image, and further comprising the step of providing residual image data representing those portions of the target image not represented by compression codes.

33. The method of claim 32, wherein said residual image data comprises data corresponding to the carrying out of the method upon portions of the image remaining after carrying out of the method for other portions of the image.

34. The method of claim 32, wherein said residual image data comprises data corresponding to the location and color or gray scale rendering of portions of the image remaining after carrying out the method for other portions of the image.

35. The method of claim 29, wherein the transformation coefficients are affine transformation coefficients.

36. The method of claim 29, wherein the step of collaging the transformed copy on the display includes the step of modifying the transformation coefficients corresponding to the coordinates of the location and dimensions of the transformed copy.

37. In an image compression system, a method for encoding rendering information for an image represented by an array of pixels, each pixel having a rendering value, comprising the steps of, in a programmed computer:

determining the number of different rendering values in an input image to be encoded;

determining a measure corresponding to the cumulation of the rendering values for all pixels in the image;

assigning a weighting to each one of the number of different rendering values;

assigning a rendering mapping of each one of the rendering values to one of the different renderings to be encoded;

encoding predetermined features of the input image with an iterated function system to as to obtain a plurality of sets of transformation coefficients representing the image without color rendering;

assigning a probability code to each one of the sets of transformation coefficients in relation to the relative weight assigned to the number of different rendering values; and providing as an encoded output a set of compression codes comprising a plurality of sets of transformation coefficients and a corresponding probability code for each one of the sets of transformation coefficients.

38. The method of claim 37, wherein the step of encoding predetermined features of the input images comprises encoding geometric features of the image having common characteristics.

39. The method of claim 37, wherein the step of assigning a rendering mapping comprises assigning an arbitrary assignment of a predetermined color to each of the rendering values.

40. The method of claim 37, wherein the step of encoding predetermined features of the input images comprises the steps of:

storing the input image in a memory;

displaying the image stored in the memory on a display;

selecting a geometric first region of the image displayed on the display with selecting means;

generating and displaying a contractive copy of the first region in the memory;

storing a set of transformation coefficients corresponding to the transformation creating the contractive copy;

on the display, collaging the transformed contractive copy with respect to the first region to align geometric features of the transformed contractive copy with corresponding geometric features of the first region;

repeating the steps of generating and displaying a contractive copy, storing the transformation coefficients, and collaging the transformed contractive copy until substantially all of the first region is covered by a collage of transformed contractive copies, thereby providing a set of a plurality of transformation coefficients; and providing as an output a set of iterated function system compression codes corresponding to the set of a plurality of transformation coefficients.

41. The method of claim 40, wherein the transformation coefficients are affine transformation coefficients.

42. The method of claim 40, wherein the step of collaging the transformed copy on the display includes the step of modifying the transformation coefficients corresponding to the coordinates of the location and dimensions of the transformed copy.

43. The method of claim 37, further comprising a method for decoding encoded rendering information, comprising:

receiving and storing a plurality of compression codes comprising the transformation coefficients and probability codes in a memory;

determining an initial point in a display memory;

randomly selecting one of the transformation coefficients in the memory weighted by its corresponding probability code;

performing a transformation on the initial point corresponding to the selected transformation coefficients to move the initial point to a second point;

storing a picture element in a display memory at a memory location corresponding to the location of the second point;

utilizing the second point from the preceding step as an initial point, repeating the steps of randomly selecting one of the transformation coefficients, performing a transformation, and storing a picture element, until an output image converges to an attractor; and displaying data corresponding to the stored picture elements corresponding to the attractor as a decoded output image.

44. The method of claim 43, further comprising the steps of:

storing in a hit count memory a hit count of the number of times that each point in said display space corresponding to the display memory was plotted;

responsive to the plotting of a particular point in display space, incrementing the hit count corresponding to that particular point in the display space;

after the attractor has stabilized, retrieving the hit count for each point in the display space and providing a rendering index corresponding thereto;

storing in a rendering index memory rendering values corresponding to a plurality of color indices; and displaying the rendering value stored in the rendering index memory associated with the rendering index for a particular point when that particular point is displayed.

45. The method of claim 37, wherein the rendering information is gray scale information.

46. The method of claim 37, wherein the rendering information is color information.

47. A method for compressing images, comprising the steps of, in a programmed computer:

storing an input target image to be compressed in a target memory;

selecting geometric regions of the input target image having predetermined similar fractal characteristics;

determining a separate set of iterated function system codes corresponding to and representing each of said selected geometric regions, to thereby obtain a plurality of sets of iterated function system codes;

determining a residual set of data corresponding to those residual portions of the image not represented by one of said plurality of sets of iterated function system codes;

encoding the residual set with a conventional data compression scheme to obtain a set of conventional compression codes;

providing as a compressed output representing the entire image a set of iterated function system codes representing the selected geometric regions and a set of conventional compression codes representing the residual portions of the image.

48. The method of claim 47, wherein the iterated function system codes are the coefficients of a collage of contractive transformations applied to each of the selected geometric regions.

49. The method of claim 48, wherein the contractive transformations are affine transformations.

50. The method of claim 47, wherein the iterated function system codes are determined by the steps of:

displaying the image stored in the memory on a display;

generating and displaying a contractive copy of a first geometric region in the memory;

storing a set of transformation coefficients corresponding to the transformation creating the contractive copy;

on the display, collaging the transformed contractive copy with respect to the first region to align geometric features of the transformed contractive copy with corresponding geometric features of the first region; and repeating the steps of generating and displaying a contractive copy, storing the transformation coefficients, and collaging the transformed contractive copy until substantially all of the first region is covered by a collage of transformed contractive copies, thereby providing a set of a plurality of transformation coefficients.

51. The method of claim 50, wherein the step of collaging the transformed copy on the display includes the step of modifying the transformation coefficients corresponding to the coordinates of the location and dimensions of the transformed copy.

52. The method of claim 47, wherein the method of determining iterated function system codes is an iterative method comprising the steps of:

generating contractive transformed copies of a portion of the target image;

aligning the contractive transformed copies with respect to the selected regions of the target image stored in the target memory until particular geometric features of the selected region of the target image are substantially covered by a collage;

providing, as a compressed image output, a plurality of compression codes corresponding to the numerical coefficients of the plurality of contractive transformed copies of the portion of the target image;

decoding the compression codes to generate approximation image;

storing the approximation image in an approximation image memory;

comparing the target image stored in the target memory to the approximation image stored in the approximation image memory means and providing error data as a function of the error between the two images;

modifying the collage of contractive transformed copies of the portion of the target image in response to the error data to minimize the number of compression codes.

53. The method of claim 52, wherein the method is carried out on a programmed computer.

54. The method of claim 52, wherein the step of comparing the approximation image to the target image is performed by an operator viewing the two images on a display screen, and wherein the step of modifying the collage comprises the step generating and collaging additional transformed copies or the step of repositioning or reshaping previously-generated transformed copies with respect to the collage.

55. The method of claim 52, wherein the method is carried out separately for each of the plurality of regions of the target image, thereby generating a plurality of sets of compression codes, each of said sets of compression codes corresponding to the carrying out of the method for a single region of the target image, and further comprising the step of providing residual image data representing those regions of the target image not represented by compression codes.

56. The method of claim 55, wherein said residual image data comprises data corresponding to the carrying out of the method upon regions of the image remaining after carrying out of the method for other portions of the image.

57. The method of claim 55, wherein said residual image data comprises data corresponding to the location and color or gray scale rendering of portions of the image remaining after carrying out the method for other portions of the image.

58. A deterministic method for decoding iterated function system compression codes to generate an image by parallel processing, comprising the steps of:
receiving and storing a plurality of n sets of compression codes in a decoder;
providing an initial image in a display memory;
concurrently performing in a separate one of a plurality of processing units each of the n transformations corresponding to the stored compression codes on the initial image so as to generate n transformed images,
forming a second image corresponding to the union of the n transformed images;
repeatedly iterating by carrying out the above steps of concurrently performing n transformations and forming the second image, wherein, for each iteration, the second image formed in the previous iteration is utilized as the initial image for the following iteration and continuing such iteration until an attractor image stabilizes; and
displaying data corresponding to the attractor as a decoded output image.

59. The method of claim 58, further comprising the step of partitioning the display memory into m different regions, and wherein the step of performing transformations comprises concurrently performing each of the n transformations on each of the m regions so as to generate n·m transformed images, and wherein the step of forming a second image comprises forming the second image as the union of n·m transformed images.

60. A random iteration method for decoding iterated system compression codes to generate an image by parallel processing, comprising the steps of:
receiving and storing a plurality of compression codes in a decoder;
determining a plurality n of initial points in a display memory;
randomly selecting n of the compression codes with replacement;
concurrently applying the transformation corresponding to each of the selected compression codes in one of a plurality of processing units to a particular initial point selected from the plurality of initial points without replacement to generate a set of n transformed points;
repeatedly iterating by carrying out the above steps of randomly selecting n compression codes and applying the corresponding transformations, wherein for each iteration, the set of n transformed points generated in the previous iteration is utilized as the plurality of n initial points for the following iteration, and continuing such iteration until an attractor image stabilizes; and
displaying data corresponding to the attractor as decoded output image.

61. A random iteration method for decoding iterated system compression codes to generate an image by parallel processing, comprising the steps of:
receiving and storing a plurality of compression codes in a decoder;
independently and concurrently, with a plurality of n processors, and until an attractor image stabilizes, carrying out the following steps of:
determining an initial point in a display memory,
randomly selecting one of the plurality of compression codes,
applying the transformation corresponding to the selected compression code to the initial point to generate a transformed point, and
repeatedly iterating by carrying out the above steps of selecting a compression code and applying the corresponding transformation, wherein for each iteration, the transformed point generated in the previous iteration is utilized as the initial point of the following iteration; and
after the attractor image stabilizes, displaying data corresponding to the attractor as a decoded output image.

62. The method of claim 1, wherein the method is performed on a programmed computer.

63. The method of claim 1, further comprising the step of transmitting or storing the transformation coefficients as data compression codes representative of the input image.

64. The method of claim 1, further comprising the steps of:
comparing the input image to an approximation image stored in an approximation image memory;
providing error data as a function of the error between the input image and the approximation image; and
modifying the collage of contractive transformed copies in response to the error data to minimize the number of transformation coefficients.

65. The method of claim 63, wherein the step of comparing the approximation image to the input image is performed by an operator viewing the two images on a display screen, and wherein the step of modifying the collage comprises the steps of generating and collaging additional transformed copies or repositioning or reshaping previously-generated transformed copies with respect to the collage.

66. The method of claim 64, wherein the method is carried out separately for each of a plurality of portions of the input image, thereby generating a plurality of sets of transformation coefficients, each of said sets of transformation coefficients corresponding to the carrying out of the method for a single portion of the input image, and further comprising the step of providing residual image data representing those portions of the input image not represented by the transformation coefficients.

67. The method of claim 66, wherein said residual image data comprises data corresponding to the carrying out of the method upon portions of the image remaining after carrying out of the method for other portions of the image.

68. The method of claim 66, wherein said residual image data comprises data corresponding to the location and color or gray scale rendering of portions of the image remaining after carrying out the method for other portions of the image.

69. The method of claim 1, wherein the step of collaging the transformed copy on the display includes the step of modifying the transformation coefficients corresponding to the coordinates of the location and dimensions of the transformed copy.

* * * * *